United States Patent
Skaggs et al.

(10) Patent No.: US 12,162,501 B2
(45) Date of Patent: *Dec. 10, 2024

(54) SYSTEMS AND METHODS OF DETERMINING EFFECTIVENESS OF VEHICLE SAFETY FEATURES

(71) Applicant: STATE FARM MUTUAL AUTOMOBILE INSURANCE COMPANY, Bloomington, IL (US)

(72) Inventors: Jaime Skaggs, Chenoa, IL (US); Jody Ann Thoele, Bloomington, IL (US); Angela Glusick, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/242,754

(22) Filed: Sep. 6, 2023

(65) Prior Publication Data

US 2023/0406329 A1   Dec. 21, 2023

Related U.S. Application Data

(63) Continuation of application No. 17/941,096, filed on Sep. 9, 2022, now Pat. No. 11,787,422, which is a
(Continued)

(51) Int. Cl.
*B60W 50/00* (2006.01)
*G06N 20/00* (2019.01)
(Continued)

(52) U.S. Cl.
CPC ......... *B60W 50/0098* (2013.01); *G06N 20/00* (2019.01); *G06Q 40/08* (2013.01);
(Continued)

(58) Field of Classification Search
CPC ..... B60W 50/0098; B60W 2050/0083; B60W 2556/55; G06N 20/00; G06Q 40/08; G07C 5/02
(Continued)

(56) References Cited

U.S. PATENT DOCUMENTS 9,311,271 B2  4/2016 Wright
9,633,487 B2  4/2017 Wright
(Continued)

FOREIGN PATENT DOCUMENTS

EP  3239686 A1  11/2017
EP  3578433 B1  8/2020
(Continued)

OTHER PUBLICATIONS

U.S. Appl. No. 17/941,096, Nonfinal Office action, mailed Feb. 16, 2023.
(Continued)

*Primary Examiner* — Isaac G Smith
(74) *Attorney, Agent, or Firm* — MARSHALL, GERSTEIN & BORUN LLP

(57) ABSTRACT

The following relates generally to determining effectiveness of an update to a vehicle feature. In some embodiments, information indicating an update to a vehicle feature, and accident record information may be received. A first dataset from before the update was implemented in the vehicle, and a second dataset from after the update was implemented in the vehicle may then be constructed. An effectiveness score may then be calculated based upon the first and second datasets.

20 Claims, 15 Drawing Sheets

Related U.S. Application Data continuation-in-part of application No. 16/928,793, filed on Jul. 14, 2020, now Pat. No. 11,661,072.

(60) Provisional application No. 63/349,912, filed on Jun. 7, 2022, provisional application No. 62/935,890, filed on Nov. 15, 2019, provisional application No. 62/905,742, filed on Sep. 25, 2019, provisional application No. 62/879,130, filed on Jul. 26, 2019, provisional application No. 62/874,749, filed on Jul. 16, 2019.

(51) Int. Cl.
*G06Q 40/08* (2012.01)
*G07C 5/02* (2006.01)

(52) U.S. Cl.
CPC ....... *G07C 5/02* (2013.01); *B60W 2050/0083* (2013.01); *B60W 2556/55* (2020.02)

(58) Field of Classification Search
USPC ........................................................ 701/29.3
See application file for complete search history.

(56) References Cited

U.S. PATENT DOCUMENTS

| | | | |
|---|---|---|---|
| 9,830,748 B2 | 11/2017 | Rosenbaum | |
| 9,990,782 B2 | 6/2018 | Rosenbaum | |
| 10,192,369 B2 | 1/2019 | Wright | |
| 10,198,879 B2 | 2/2019 | Wright | |
| 10,269,190 B2 | 4/2019 | Rosenbaum | |
| 10,467,824 B2 | 11/2019 | Rosenbaum | |
| 11,227,452 B2 | 1/2022 | Rosenbaum | |
| 11,407,410 B2 | 8/2022 | Rosenbaum | |
| 11,524,707 B2 | 12/2022 | Rosenbaum | |
| 11,594,083 B1 | 2/2023 | Rosenbaum | |
| 11,661,072 B1 | 5/2023 | Cardona et al. | |
| 11,787,422 B2 | 10/2023 | Skaggs et al. | |
| 2007/0268158 A1* | 11/2007 | Gunderson | G07C 5/085 340/933 |
| 2018/0275667 A1* | 9/2018 | Liu | G01C 21/26 |
| 2019/0016342 A1 | 1/2019 | Fredman | |
| 2019/0034197 A1* | 1/2019 | Lin | H04W 4/40 |
| 2022/0092893 A1 | 3/2022 | Rosenbaum | |
| 2022/0340148 A1 | 10/2022 | Rosenbaum | |
| 2023/0060300 A1 | 3/2023 | Rosenbaum | |

FOREIGN PATENT DOCUMENTS

| | | |
|---|---|---|
| EP | 3730375 B1 | 10/2021 |
| EP | 3960576 A1 | 3/2022 |
| EP | 4190659 A1 | 6/2023 |
| EP | 4190660 A1 | 6/2023 |
| WO | WO-2015132582 A2 | 9/2015 |

OTHER PUBLICATIONS

U.S. Appl. No. 16/928,793, Notice of Allowance, mailed Jan. 20, 2023.

U.S. Appl. No. 17/941,096, Notice of Allowance, dated Jun. 14, 2023.

U.S. Appl. No. 17/941,216, Nonfinal Office Action, dated Jun. 6, 2024.

U.S. Appl. No. 18/137,297, Notice of Allowance, dated Apr. 19, 2024.

U.S. Appl. No. 18/137,297, Nonfinal Office Action, dated Jan. 5, 2024.

* cited by examiner

Vehicle Building Information

[SF1H3AFC7JNXYZ008] [Search]

👁 View Original    ⤓ DOWNLOAD SPECS ▼

| VIN | SF1H3AFC7JNXYZ008 | Engine Type | Engine Type |
|---|---|---|---|
| MAKE | Audi | Body Type | Body Type |
| MODEL | A6 | Drive Type | Drive Type |
| YEAR | 2018 | Transmission | Transmission |

Features ▶

- Proactive Passenger Protection System
- Park Distance Warning
- Electronic Stability Control
- Blind Spot Warning
- Advanced Driver Assistance Feature
- Side Airbag
- 360-Degree Camera System
- Dynamic Headlight Range Control
- Lane Keeping Assist > The ontology model is applied to original build sheets through the classification process. Manufacturer-specific build sheet terms are identified and converted to common terminology as specified in the model.

Vehicle Build Information

| AUTO | Search |

Vehicle Feature
Automatic Braking System
Automatic Emergency Braking Sy
Automatic Headlight Control
Pedestrian Automatic Braking

*Type-ahead helps choose from common terminology*

*Export list of VINs so they may be joined with other data for analytic purposes*

Vehicle Build Information

| BLIND SPOT WARNING | Search | Download |

(MAKE: Audi ⊗) (MAKE: Ford ⊗) (MAKE: Volkswagen ⊗) (MODEL: A6 ⊗) (MODEL: F-150 ⊗)
(MODEL: Mustang ⊗) (MODEL: Passat ⊗) (YEAR: 2019 ⊗) (YEAR: 2018 ⊗) (YEAR: 2017 ⊗)
(YEAR: 2016 ⊗) (YEAR: 2015 ⊗) (FEATURE : Blind Spot Warning ⊗)

Make
☑ Audi (0)
☑ Ford (0)
☑ Volkswagen (0)

Model
☑ A6 (0)
☑ F-150 (0)
☑ Mustang (0)
☑ Passat (0)

Year
☑ 2019 (0)
☑ 2018 (0)
☑ 2017 (0)
☑ 2016 (0)
☑ 2015 (0)

Vehicle Feature
☐ 360-Degree Camera System (0)
☐ Adaptive Cruise Control (0)
☐ Advanced Driver Assistance Feature (0)
☐ Advanced Safety Feature (0)

Show 10 ▼ entries        Search: [    ]

| Make | Model | Year | VIN | |
|------|-------|------|-----|---|
| Audi | A6 | 2018 | SF1H3AFCXJNXYZ014 | Details |
| Audi | A6 | 2018 | SF1H3AFC9JNXYZ007 | Details |
| Audi | A6 | 2018 | SF1HFAFC8JNXYZ015 | Details |
| Audi | A6 | 2018 | SF1H3BFC8JNXYZ012 | Details |
| Audi | A6 | 2018 | SF1H3AFC7JNXYZ008 | Details |
| Audi | A6 | 2018 | SF1H3AFCXJNXYZ012 | Details |
| Audi | A6 | 2018 | SF1H3AFC8JNXYZ003 | Details |
| Audi | A6 | 2018 | SF1H3AFC7JNXYZ009 | Details |

*Faceting will help narrow search results (i.e., show all VINs from 2017 Ford F-150 models with Blind Spot Warning and Forward Collision Warning)*

850

Standardized Build Sheet Fields vin
make
model
model_year
trim
drivetrain
body_type
fuel_type
engine_num_cylinders
base_msrp
msrp
engine_layout
engine_capacity
engine_hp
transmission_type
transmission_speeds
wheelbase
curb_weight_lbs
gross_vehicle_weight_min_lbs
gross_vehicle_weight_max_lbs
length
width
height
truck_bed_length
tire_wheel_diameter
tire_aspect_ratio
tire_width
tire_construction
adaptive_cruise_control
adaptive_cruise_control_with_stop
backup_camera
blind_spot_warning
blind_spot_prevention
automatic_high_beams
adaptive_headlights_curve
adaptive_headlights_distance
adaptive_driving_beams
forward_collision_warning
forward_collision_warning_with_AEB
forward_collision_warning_with_AEB_and_ped_det

FIG. 8

SYSTEMS AND METHODS OF DETERMINING EFFECTIVENESS OF VEHICLE SAFETY FEATURES

CROSS-REFERENCE TO RELATED APPLICATIONS

The present application is a continuation of U.S. patent application Ser. No. 17/941,096, filed Sep. 9, 2022, entitled "SYSTEMS AND METHODS OF DETERMINING EFFECTIVENESS OF VEHICLE SAFETY FEATURES" which is a continuation-in-part (CIP) of U.S. patent application Ser. No. 16/928,793, filed Jul. 14, 2020, entitled "SYSTEMS AND METHODS OF DETERMINING EFFECTIVENESS OF VEHICLE SAFETY FEATURES", which claims the priority benefit of U.S. Provisional Patent Application No. 62/874,749, filed Jul. 16, 2019, entitled "SYSTEMS AND METHODS OF DETERMINING EFFECTIVENESS OF VEHICLE SAFETY FEATURES"; U.S. Provisional Patent Application No. 62/879,130, filed Jul. 26, 2019, entitled "SYSTEMS AND METHODS OF DETERMINING EFFECTIVENESS OF VEHICLE SAFETY FEATURES"; U.S. Provisional Patent Application No. 62/905,742, filed Sep. 25, 2019, entitled "SYSTEMS AND METHODS OF DETERMINING EFFECTIVENESS OF VEHICLE SAFETY FEATURES"; and U.S. Provisional Patent Application No. 62/935,890, filed Nov. 15, 2019, entitled "SYSTEMS AND METHODS OF DETERMINING EFFECTIVENESS OF VEHICLE SAFETY FEATURES"; each of which are incorporated herein by reference in their entirety. In addition, U.S. patent application Ser. No. 17/673,171, filed Feb. 16, 2022, entitled "SYSTEMS AND METHODS OF DETERMINING VEHICLE REPARABILITY"; U.S. patent application Ser. No. 17/711,412, filed Feb. 16, 2022, entitled "SYSTEMS AND METHODS OF DETERMINING EFFECTIVENESS OF VEHICLE SAFETY FEATURES"; and U.S. patent application Ser. No. 17/673,037, filed Feb. 16, 2022, entitled "SYSTEMS AND METHODS OF BUILDING A CONSISTENT VEHICLE DATA REPOSITORY" are also each incorporated herein by reference in their entirety. The present application also claims the priority benefit of U.S. patent application Ser. No. 63/349,912, filed Jun. 7, 2022, entitled "SYSTEMS AND METHODS OF DETERMINING EFFECTIVENESS OF VEHICLE SAFETY FEATURES."

FIELD OF THE DISCLOSURE

The present disclosure generally relates to vehicle safety and, more particularly, to systems and methods of determining the effectiveness of vehicle safety features.

BACKGROUND

The background description provided herein is for the purpose of generally presenting the context of the disclosure. Work of the presently named inventors, to the extent it is described in the background section, as well as aspects of the description that may not otherwise qualify as prior art at the time of filing, are neither expressly nor impliedly admitted as prior art against the present disclosure.

Currently, many vehicles are equipped with smart safety features configured to improve the safety of the vehicle. However, it can be difficult to determine which smart safety features are most effective at preventing (or decreasing the frequency or severity of) vehicle accidents. Likewise, it may be difficult to determine if updates to vehicle features are effective at preventing (or decreasing the frequency or severity of) vehicle accidents, and may further be difficult to keep track of the effectiveness of vehicle feature updates after they are calculated.

SUMMARY

The present embodiments may include collecting initial vehicle build information for various automobiles, such as newly manufactured automobiles. The initial vehicle build information may include advanced driver assist features, autonomous or semi-autonomous vehicle features, technologies, or systems, and/or other safety and newly developed features, systems, and/or updated software versions for the systems. Vehicle data may then be collected as the vehicle is in use. For instance, operational data may be collected regarding new feature, system, and software performance and usage. The operational data may be analyzed and monitored to determine which new features, systems, and software versions are operating as intended, i.e., safely or with low risk, or with lower risk than conventional systems, and/or those technologies that need to be revised or improved upon to further lower the risk of automobile collisions and enhance vehicle safety.

In one aspect, vehicle build information (VBI) for vehicles manufactured by a plurality of OEMs may be obtained. The VBI may contain OEM-specific terminology for smart safety features associated with each vehicle. The obtained VBI may be analyzed to generate an ontology model mapping each feature to any OEM-specific terminology associated with the feature. The ontology model may be applied to the VBI to generate translated VBI for each vehicle, such that the OEM-specific terminology associated with each feature is replaced with OEM-agnostic terminology for the feature (i.e., common terminology for the feature). Vehicle accident record information may be obtained for each vehicle, including, e.g., the number, frequency, severity, etc. of accidents associated with each vehicle. Using the OEM-agnostic terminology for each feature associated with each vehicle and the vehicle accident information for each vehicle, an effectiveness score associated with each feature may be calculated.

In another aspect, a computer-implemented method for determining the effectiveness of vehicle safety features is provided. The method may include: (1) obtaining, by one or more processors (and/or associated transceivers), vehicle build information for a plurality of vehicles manufactured by a plurality of original equipment manufacturers (OEMs), the vehicle build information containing OEM-specific terminology associated with one or more smart safety features associated with each vehicle; (2) analyzing, by the one or more processors, obtained vehicle build information to generate an ontology model mapping each smart safety feature to any OEM-specific terminology associated with the smart safety feature for each OEM; (3) applying, by the one or more processors, the ontology model to the vehicle build information to generate translated vehicle build information for each of the plurality of vehicles, such that the OEM-specific terminology associated with each smart safety feature is replaced with OEM-agnostic terminology for the smart safety feature; (4) obtaining, by the one or more processors (and/or associated transceivers), vehicle accident record information for each of the plurality of vehicles, wherein the vehicle accident record information includes one or more of a number of accidents, a frequency of accidents, or a severity of accidents associated with each of the plurality of vehicles; and/or (5) calculating, by the one or more processors, using the OEM-agnostic terminology for each smart safety feature associated with each of the plurality of vehicles and the vehicle accident record information for each of the plurality of vehicles, an effectiveness score associated with each smart safety feature. The method may include additional, less, or alternate actions, including those discussed elsewhere herein.

In another aspect, a computer system for determining the effectiveness of vehicle safety features is provided. The computer system may include one or more processors and/or associated transceivers; and a non-transitory program memory communicatively coupled to the one or more processors and/or associated transceivers, and storing executable instructions. The executable instructions, when executed by the one or more processors, may cause the computer system to: (1) obtain vehicle build information for a plurality of vehicles manufactured by a plurality of original equipment manufacturers (OEMs), the vehicle build information containing OEM-specific terminology associated with one or more smart safety features associated with each vehicle; (2) analyze obtained vehicle build information to generate an ontology model mapping each smart safety feature to any OEM-specific terminology associated with the smart safety feature for each OEM; (3) apply the ontology model to the vehicle build information to generate translated vehicle build information for each of the plurality of vehicles, such that the OEM-specific terminology associated with each smart safety feature is replaced with OEM-agnostic terminology for the smart safety feature; (4) obtain vehicle accident record information for each of the plurality of vehicles, wherein the vehicle accident record information includes one or more of a number of accidents, a frequency of accidents, or a severity of accidents associated with each of the plurality of vehicles; and/or (5) calculate, using the OEM-agnostic terminology for each smart safety feature associated with each of the plurality of vehicles and the vehicle accident record information for each of the plurality of vehicles, an effectiveness score associated with each smart safety feature. The computer system may include additional, less, or alternate functionality, including that discussed elsewhere herein.

In another aspect, a tangible, non-transitory computer-readable medium storing executable instructions for determining the effectiveness of vehicle safety features is provided. The executable instructions, when executed by at least one processor of a computer system, may cause the computer system to: (1) obtain vehicle build information for a plurality of vehicles manufactured by a plurality of original equipment manufacturers (OEMs), the vehicle build information containing OEM-specific terminology associated with one or more smart safety features associated with each vehicle; (2) analyze obtained vehicle build information to generate an ontology model mapping each smart safety feature to any OEM-specific terminology associated with the smart safety feature for each OEM; (3) apply the ontology model to the vehicle build information to generate translated vehicle build information for each of the plurality of vehicles, such that the OEM-specific terminology associated with each smart safety feature is replaced with OEM-agnostic terminology for the smart safety feature; (4) obtain vehicle accident record information for each of the plurality of vehicles, wherein the vehicle accident record information includes one or more of a number of accidents, a frequency of accidents, or a severity of accidents associated with each of the plurality of vehicles; and/or (5) calculate, using the OEM-agnostic terminology for each smart safety feature associated with each of the plurality of vehicles and the vehicle accident record information for each of the plurality of vehicles, an effectiveness score associated with each smart safety feature. The executable instructions may direct additional, less, or alternate functionality, including that discussed elsewhere herein.

In another aspect, a computer-implemented method for determining the effectiveness of vehicle safety features is provided. The method may include: (1) obtaining, collecting, or receiving, by one or more processors and/or associated transceivers (such as via wireless communication or data transmission over one or more radio frequency links), vehicle build information for a plurality of vehicles manufactured by a plurality of original equipment manufacturers (OEMs), the vehicle build information containing OEM-specific terminology associated with one or more smart safety features associated with each vehicle (or advanced vehicle safety features (AVSFs)); (2) generating or using, via the one or more processors, an ontology or ontology model to develop a common terminology for the AVSFs or one or more smart safety features; (3) collecting or receiving, via the one or more processors and/or associated transceivers (such as via wireless communication or data transmission over one or more radio frequency links), vehicle telematics data and/or AVSF data from a mobile device associated with a vehicle owner or a vehicle controller or transceiver; and/or (4) analyzing, via the one or more processors, the vehicle telematics data and/or AVSF data to determine an individual AVSF performance rating or safety score for each AVSF defined by the ontology or ontology model. The method may include additional, less, or alternate actions, including those discussed elsewhere herein.

In another aspect, a computer system configured to determine the effectiveness of vehicle safety features is provided. The computer system may include one or more processors, servers, and/or associated transceivers configured to: (1) obtain, collect, or receive, such as via wireless communication or data transmission over one or more radio frequency links, vehicle build information for a plurality of vehicles manufactured by a plurality of original equipment manufacturers (OEMs), the vehicle build information containing OEM-specific terminology associated with one or more smart safety features associated with each vehicle (or advanced vehicle safety features (AVSFs)); (2) generate or use an ontology or ontology model to develop a common terminology for the AVSFs or one or more smart safety features; (3) collect or receive, such as via wireless communication or data transmission over one or more radio frequency links, vehicle telematics data and/or AVSF data from a mobile device associated with a vehicle owner or a vehicle controller or transceiver; and/or (4) analyze the vehicle telematics data and/or AVSF data to determine an individual AVSF performance rating or safety score for each AVSF defined by the ontology or ontology score. The computer system may include additional, less, or alternate functionality, including that discussed elsewhere herein.

In another aspect, a computer-implemented method for determining the effectiveness of vehicle safety features is provided. The method may include: (1) obtaining, collecting, or receiving, by one or more processors and/or associated transceivers (such as via wireless communication or data transmission over one or more radio frequency links), vehicle build information for a plurality of vehicles manufactured by a plurality of original equipment manufacturers (OEMs), the vehicle build information containing OEM-specific terminology associated with one or more smart safety features associated with each vehicle (or advanced vehicle safety features (AVSFs)); (2) generating or using, via the one or more processors, an ontology or ontology model to develop a common terminology for the AVSFs or one or more smart safety features; (3) collecting or receiving, via the one or more processors and/or associated transceivers (such as via wireless communication or data transmission over one or more radio frequency links), vehicle telematics data associated with a vehicle collision and/or AVSF data associated with the vehicle collision, such as from a mobile device associated with a vehicle owner or a vehicle controller or transceiver; and/or (4) analyzing, via the one or more processors, the vehicle telematics data associated with the vehicle collision and/or AVSF data associated with the vehicle collision to determine an individual AVSF performance rating or safety score for each AVSF defined by the ontology or ontology model. The method may include additional, less, or alternate actions, including those discussed elsewhere herein.

In another aspect, a computer system configured to determine the effectiveness of vehicle safety features is provided. The computer system may include one or more processors, servers, and/or associated transceivers configured to: (1) obtain, collect, or receive, such as via wireless communication or data transmission over one or more radio frequency links, vehicle build information for a plurality of vehicles manufactured by a plurality of original equipment manufacturers (OEMs), the vehicle build information containing OEM-specific terminology associated with one or more smart safety features associated with each vehicle (or advanced vehicle safety features (AVSFs)); (2) generate or use an ontology or ontology model to develop a common terminology for the AVSFs or one or more smart safety features; (3) collect or receive, such as via wireless communication or data transmission over one or more radio frequency links, vehicle telematics data associated with the vehicle collision and/or AVSF data associated with the vehicle collision, such as from a mobile device associated with a vehicle owner or a vehicle controller or transceiver; and/or (4) analyze the vehicle telematics data associated with the vehicle collision and/or AVSF data associated with the vehicle collision to determine an individual AVSF performance rating or safety score. The computer system may include additional, less, or alternate functionality, including that discussed elsewhere herein.

In another aspect, a computer-implemented method for analyzing the performance of vehicle safety features is provided. The method may include: (1) obtaining, collecting, or receiving, by one or more processors and/or associated transceivers (such as via wireless communication or data transmission over one or more radio frequency links), vehicle build information for a plurality of vehicles manufactured by a plurality of original equipment manufacturers (OEMs), the vehicle build information containing OEM-specific terminology associated with one or more smart safety features associated with each vehicle (or advanced vehicle safety features (AVSFs)); (2) generating or using, via the one or more processors, an ontology or ontology model to develop a common terminology for the AVSFs or one or more smart safety features; (3) collecting or receiving, via the one or more processors and/or associated transceivers (such as via wireless communication or data transmission over one or more radio frequency links), vehicle telematics data associated with a vehicle collision and/or AVSF data associated with the vehicle collision, such as from a mobile device associated with a vehicle owner or a vehicle controller or transceiver; and/or (4) analyzing, via the one or more processors, the vehicle telematics data associated with the vehicle collision and/or AVSF data associated with the vehicle collision to determine, for each AVSF defined by the ontology or ontology model, (i) whether the performance of the AVSF was relevant to the vehicle collision and/or (ii) whether the AVSF operated as intended prior to, during, and/or after the vehicle collision. The method may include additional, less, or alternate actions, including those discussed elsewhere herein.

In another aspect, a computer system configured to analyze the performance of vehicle safety features is provided. The computer system may include one or more processors, servers, and/or associated transceivers configured to: (1) obtain, collect, or receive, such as via wireless communication or data transmission over one or more radio frequency links, vehicle build information for a plurality of vehicles manufactured by a plurality of original equipment manufacturers (OEMs), the vehicle build information containing OEM-specific terminology associated with one or more smart safety features associated with each vehicle (or advanced vehicle safety features (AVSFs)); (2) generate or use an ontology or ontology model to develop a common terminology for the AVSFs or one or more smart safety features; (3) collect or receive, such as via wireless communication or data transmission over one or more radio frequency links, vehicle telematics data associated with a vehicle collision and/or AVSF data associated with the vehicle collision, such as from a mobile device associated with a vehicle owner or a vehicle controller or transceiver; and/or (4) analyze the vehicle telematics data associated with the vehicle collision and/or AVSF data associated with the vehicle collision to determine, for each AVSF defined by the ontology or ontology model, (i) whether the performance of the AVSF was relevant to the vehicle collision and/or (ii) whether the AVSF operated as intended prior to, during, and/or after the vehicle collision. The computer system may include additional, less, or alternate functionality, including that discussed elsewhere herein.

In another aspect, a computer-implemented method for use in determining effectiveness of an update to a vehicle feature may be provided. The method may comprise: (1) obtaining, by one or more processors, vehicle data from a vehicle data repository, the vehicle data comprising a vehicle feature, and the vehicle feature being stored in an original equipment manufacturer (OEM)-agnostic terminology; (2) receiving, by the one or more processors, information indicating an update to the vehicle feature was sent to vehicles having the vehicle feature; (3) obtaining, by the one or more processors, vehicle accident record information for the vehicles having the vehicle feature, wherein the vehicle accident record information includes one or more of a number of accidents, a frequency of accidents, or a severity of accidents associated with the vehicles having the vehicle feature; (4) constructing, by the one or more processors, a first dataset with data from before the update was sent to or implemented in the vehicles having the vehicle feature; (5) constructing, by the one or more processors, a second dataset with data from after the update was sent to or implemented in the vehicles having the vehicle feature; and/or (6) calculating, by the one or more processors, an effectiveness score of the update based upon both the first data set and the second dataset. The method may include additional, fewer, or alternate actions, including those discussed elsewhere herein.

In another aspect, computer system for use in determining effectiveness of an update to a vehicle feature may be provided. The computer system may comprise one or more processors configured to: (1) obtain vehicle data from a vehicle data repository, the vehicle data comprising a vehicle feature, and the vehicle feature being stored in an original equipment manufacturer (OEM)-agnostic terminology; (2) receive information indicating an update to the vehicle feature was sent to vehicles having the vehicle feature; (3) obtain vehicle accident record information for the vehicles having the vehicle feature, wherein the vehicle accident record information includes one or more of a number of accidents, a frequency of accidents, or a severity of accidents associated with the vehicles having the vehicle feature; (4) construct a first dataset with data from before the update was sent to or implemented in the vehicles having the vehicle feature; (5) construct a second dataset with data from after the update was sent to or implemented in the vehicles having the vehicle feature; and/or (6) calculate an effectiveness score of the update based upon both the first data set and the second dataset. The computer system may include additional, less, or alternate functionality, including that discussed elsewhere herein.

In another aspect, a computer system for use in determining effectiveness of an update to a vehicle feature may be provided. The system may comprise: one or more processors; and a non-transitory program memory communicatively coupled to the one or more processors and storing executable instructions that, when executed by the one or more processors, cause the computer system to: (1) obtain vehicle data from a vehicle data repository, the vehicle data comprising a vehicle feature, and the vehicle feature being stored in an original equipment manufacturer (OEM)-agnostic terminology; (2) receive information indicating an update to the vehicle feature was sent to vehicles having the vehicle feature; (3) obtain vehicle accident record information for the vehicles having the vehicle feature, wherein the vehicle accident record information includes one or more of a number of accidents, a frequency of accidents, or a severity of accidents associated with the vehicles having the vehicle feature; (4) construct a first dataset with data from before the update was sent to or implemented in the vehicles having the vehicle feature; (5) construct a second dataset with data from after the update was sent to or implemented in the vehicles having the vehicle feature; and/or (6) calculate an effectiveness score of the update based upon both the first data set and the second dataset. The computer system may include additional, less, or alternate functionality, including that discussed elsewhere herein.

In another aspect, a computer implemented method for use in tracking effectiveness of an update to a vehicle feature using a distributed ledger may be provided. The method may comprise: (1) obtaining, by one or more processors, vehicle data comprising: (i) a vehicle feature, and (ii) identification information identifying vehicles having the vehicle feature; (2) adding to or constructing, by the one or more processors, a distributed ledger including: (i) the vehicle feature, and (ii) the identification information identifying vehicles having the vehicle feature; (3) receiving, by the one or more processors, information indicating an update to the vehicle feature was sent to vehicles having the vehicle feature; (4) obtaining, by the one or more processors, vehicle accident record information for the vehicles having the vehicle feature, wherein the vehicle accident record information includes one or more of a number of accidents, a frequency of accidents, or a severity of accidents associated with the vehicles having the vehicle feature; (5) constructing, by the one or more processors, a first dataset with data from before the update was sent to or implemented in the vehicles having the vehicle feature; (6) constructing, by the one or more processors, a second dataset with data from after the update was sent to or implemented in the vehicles having the vehicle feature; (7) calculating, by the one or more processors, an effectiveness score of the update based on both the first data set and the second dataset; and/or (8) modifying, by the one or more processors, the distributed ledger to include the effectiveness score. The method may include additional, fewer, or alternate actions, including those discussed elsewhere herein.

In another aspect, a computer system for use in tracking effectiveness of an update to a vehicle feature using a distributed ledger may be provided. The computer system may comprise one or more processors configured to: (1) obtain vehicle data comprising: (i) a vehicle feature, and (ii) identification information identifying vehicles having the vehicle feature; (2) add to or construct a distributed ledger including: (i) the vehicle feature, and (ii) the identification information identifying vehicles having the vehicle feature; (3) receive information indicating an update to the vehicle feature was sent to vehicles having the vehicle feature; (4) obtain vehicle accident record information for the vehicles having the vehicle feature, wherein the vehicle accident record information includes one or more of a number of accidents, a frequency of accidents, or a severity of accidents associated with the vehicles having the vehicle feature; (5) construct a first dataset with data from before the update was sent to or implemented in the vehicles having the vehicle feature; (6) construct a second dataset with data from after the update was sent to or implemented in the vehicles having the vehicle feature; (7) calculate an effectiveness score of the update based on both the first data set and the second dataset; and/or (8) modify the distributed ledger to include the effectiveness score. The computer system may include additional, less, or alternate functionality, including that discussed elsewhere herein.

In yet another aspect, a computer system for use in tracking effectiveness of an update to a vehicle feature using a distributed ledger may be provided. The system may comprise: one or more processors; and a non-transitory program memory communicatively coupled to the one or more processors and storing executable instructions that, when executed by the one or more processors, cause the computer system to: (1) obtain vehicle data comprising: (i) a vehicle feature, and (ii) identification information identifying vehicles having the vehicle feature; (2) add to or construct a distributed ledger including: (i) the vehicle feature, and (ii) the identification information identifying vehicles having the vehicle feature; (3) receive information indicating an update to the vehicle feature was sent to vehicles having the vehicle feature; (4) obtain vehicle accident record information for the vehicles having the vehicle feature, wherein the vehicle accident record information includes one or more of a number of accidents, a frequency of accidents, or a severity of accidents associated with the vehicles having the vehicle feature; (5) construct a first dataset with data from before the update was sent to or implemented in the vehicles having the vehicle feature; (6) construct a second dataset with data from after the update was sent to or implemented in the vehicles having the vehicle feature; (7) calculate an effectiveness score of the update based on both the first data set and the second dataset; and/or (8) modify the distributed ledger to include the effectiveness score. The computer system may include additional, less, or alternate functionality, including that discussed elsewhere herein.

BRIEF DESCRIPTION OF THE DRAWINGS

The figures described below depict various aspects of the systems and methods disclosed herein. Advantages will become more apparent to those skilled in the art from the following description of the embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive. Further, wherever possible, the following description refers to the reference numerals included in the following figures, in which features depicted in multiple figures are designated with consistent reference numerals.

FIG. 2A illustrates an example of applying an ontology model to OEM-specific vehicle build information to generate translated vehicle build information, such that OEM-specific terminology associated with smart safety features is replaced with OEM-agnostic terminology for the smart safety features, in accordance with some embodiments;

FIG. 2B illustrates an exemplary display of a user interface for searching for vehicles that have a particular type of smart safety feature, in accordance with some embodiments;

FIG. 8 illustrates an example of standardized build sheet fields;

Figure 1:
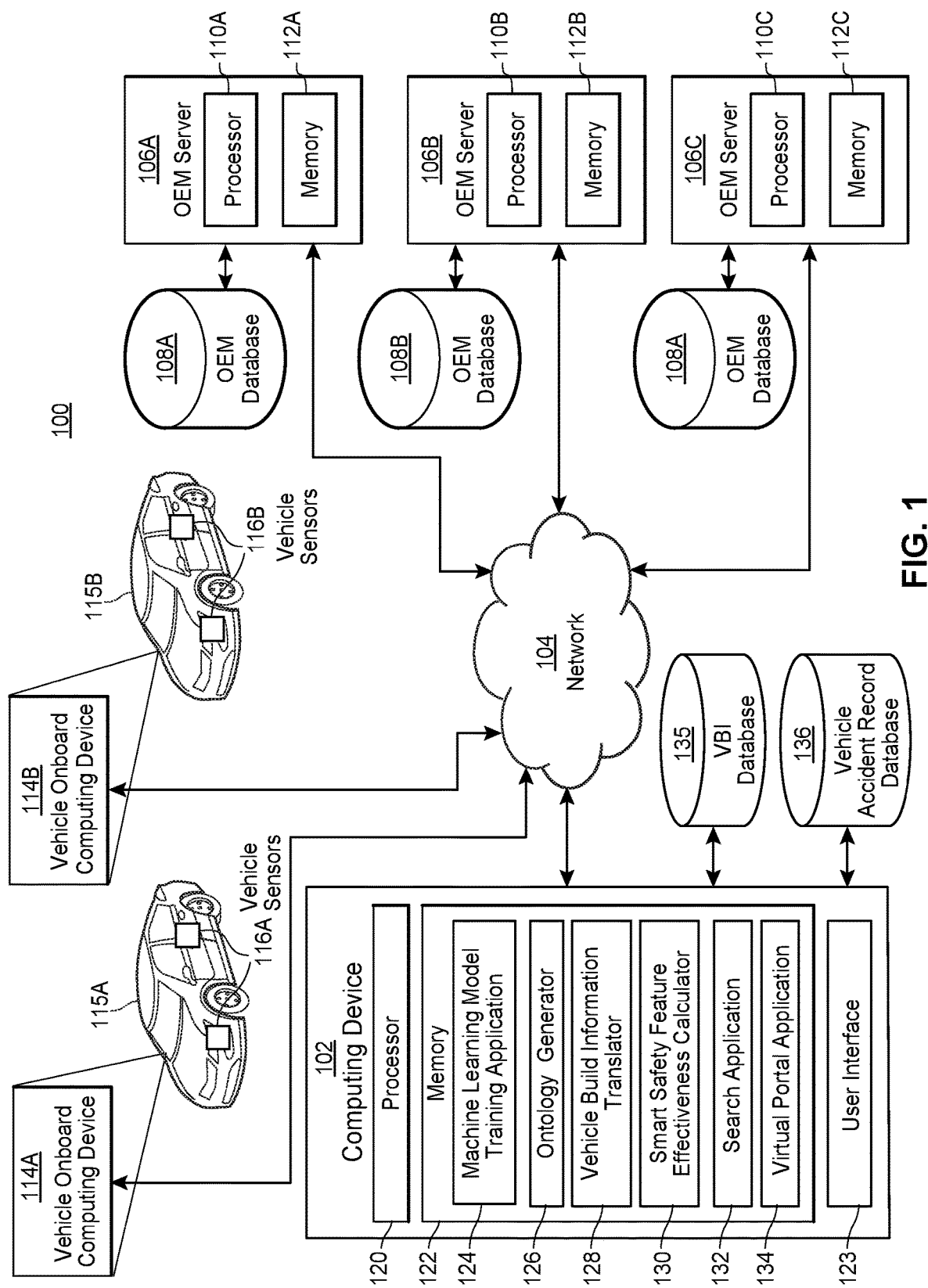
FIG. 1 illustrates a block diagram of an exemplary computer system for determining the effectiveness of vehicle safety features, in accordance with some embodiments.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Currently, many vehicles are equipped with smart safety features configured to improve the safety of the vehicle (also called "advanced vehicle safety features" (AVSFs)). These smart safety features may include, e.g., smart parking assistance, adaptive cruise control, adaptive headlights, blind spot monitoring, forward collision warning, automatic emergency braking, automatic emergency steering, lane-departure warning, lane centering, rear cross-traffic alerts, smart vehicle cameras, driver assist technologies, semi-autonomous and/or autonomous technologies and systems, etc. However, it can be difficult to determine which smart safety features are most effective at preventing (or decreasing the frequency or severity of) vehicle accidents.

While vehicle accident records may provide information indicating vehicle accident data sorted by vehicle identification number (VIN), VINs currently may not provide an indication of whether a vehicle is equipped with a particular smart safety feature. That is, while a VIN includes information such as the year, the make, and the model of the vehicle, there can be great variability in smart safety features even between vehicles of the same year, make, and model due to the highly customizable nature of smart safety features. Furthermore, in many instances, smart safety features may be switched on or off by a vehicle operator. However, vehicle accident records currently do not include information indicating whether or not a particular smart safety feature was switched on or off at the time of an accident.

Moreover, even if the smart safety features of a given vehicle are known, it can be difficult to compare the effectiveness of smart safety features between vehicle manufacturers because different vehicle manufacturer often use different terminology for the same safety technology. For example, while many original equipment manufacturers (OEMs) manufacture vehicles enabled with blind spot detection, one OEM may call this feature "lane change assist," while another OEM calls this feature "blind spot monitor." Furthermore, in some examples, one OEM may use different terminology for the same feature in marketing (e.g., "pre-sense") compared to in technical documents (e.g., "blind spot information system").

Systems and methods of determining the effectiveness of vehicle safety features are provided herein. In particular, vehicle build information obtained directly from a plurality of OEMs may be analyzed to generate an ontology mapping similar or same smart safety features between OEMs. For instance, machine learning or natural language processing may be used to group similar terminology from different OEMs, e.g., based upon similarities between descriptions of each term and/or based upon similarities between the terms themselves. Using the generated ontology, build information from a variety of vehicles from different OEMs may be translated into a common language. For example, the terms "lane change assist," "blind spot monitor," "pre-sense," and "blind spot info system," as indicated in build information from vehicles from different OEMs, may each be translated to an umbrella term "blind spot detection."

Accordingly, the translated build information for each vehicle may be cross-referenced to vehicle accident records associated with the vehicle's VIN. Using the translated build information and the vehicle accident record for each vehicle, a number, frequency, severity, etc. of accidents associated with each smart safety feature may be calculated to determine an effectiveness score for each smart safety feature. In some examples, telematics data captured by sensors associated with the vehicle may be analyzed to determine whether or not the smart safety feature was switched on at the time of the accident, and this determination may factor into the effectiveness score for the smart safety feature. Moreover, in some examples, a data log from a computing device associated with the vehicle may be analyzed to determine whether the smart safety feature had been updated at the time of the accident, or what version of software associated with the smart safety feature was used at the time of the accident, and this determination may factor into the effectiveness score for the smart safety feature as well.

In particular, the effectiveness scores for various smart safety features may be compared, ranked, etc. Practically speaking, the effectiveness scores for the smart safety features of a given vehicle may be provided to consumers, who may use these effectiveness scores for smart safety features associated with various vehicles to determine which vehicles are safest (e.g., when renting a vehicle, when purchasing a vehicle, when being transported by a vehicle when using a taxi or ride share service, etc.). Moreover, the effectiveness scores for the smart safety features of a given vehicle may be provided to OEMs, who may use this information to improve smart safety features and/or to develop more effective smart safety features.

Furthermore, in some examples, the effectiveness scores for each of the smart safety features of a given vehicle may be used to determine an insurance rating score for the vehicle and/or an insurance rating score for an insured party associated with the vehicle. Determining insurance ratings based upon the effectiveness scores for the smart safety features of a vehicle in this way improves upon conventional methods of determining insurance rating scores for vehicles, because conventionally, insurance rating scores for vehicles are simply based upon the make, model, and year of the vehicle, as indicated by the vehicle's VIN. However, with the introduction of smart safety features, there is now great variability in safety features even between vehicles of the same make, model, and year.

Consequently, conventional methods for determining insurance ratings for vehicles cannot account for specific information about which smart safety features are enabled for a particular vehicle. In contrast, the present disclosure provides ways of improving upon these conventional methods for determining insurance ratings by individualizing these ratings for specific vehicles by incorporating effectiveness scores for various smart safety features enabled for the vehicle into these insurance ratings.

Exemplary System for Determining Safety Effectiveness

Referring now to the drawings, FIG. 1 illustrates a block diagram of an exemplary computer system 100 for determining the effectiveness of vehicle safety features, in accordance with some embodiments. The high-level architecture illustrated in FIG. 1 may include both hardware and software applications, as well as various data communications channels for communicating data between the various hardware and software components, as is described below. The system may include a computing device 102 configured to communicate, e.g., via a network 104 (which may be a wired or wireless network), with OEM servers 106A, 106B, 106C associated with various OEMs. Although three OEM servers 106A, 106B, 106C associated with three separate OEMs are shown in FIG. 1, a greater or fewer number of OEM servers may be included in various embodiments. The OEM servers 106A, 106B, 106C may each respectively be associated with OEM databases 108A, 108B, 108C storing, inter alia, vehicle build information (e.g., in the form of vehicle build sheets) associated with vehicles manufactured by the OEM.

Furthermore the OEM servers 106A, 106B, 106C may each respectively include one or more processors 110A, 110B, 110C, such as one or more microprocessors, controllers, and/or any other suitable type of processor. The OEM servers 106A, 106B, 106C may each respectively further include a memory 112A, 112B, 112C (e.g., volatile memory, non-volatile memory) accessible by the respective one or more processors 110A, 110B, 110C, (e.g., via a memory controller). The respective one or more processors 110A, 110B, 110C may each interact with the respective memories 112A, 112B, 112C to obtain, for example, computer-readable instructions stored in the respective memories 112A, 112B, 112C. Additionally or alternatively, computer-readable instructions may be stored on one or more removable media (e.g., a compact disc, a digital versatile disc, removable flash memory, etc.) that may be coupled to the OEM servers 106A, 106B, 106C to provide access to the computer-readable instructions stored thereon. In particular, the computer-readable instructions stored on the respective memories 112A, 112B, 112C may include instructions for transmitting vehicle build information from the respective OEM databases 108A, 108B, 108C to the computing device 102 (e.g., via the network 104).

The computing device 102 may further communicate with vehicle onboard computing devices 114A, 114B associated with respective vehicles 115A, 115B. For example, the vehicle onboard computing devices may interface with vehicle sensors 116A, 116B associated with respective vehicles 115A, 115B. The vehicle sensors 116A, 116B may include, e.g., accelerometers, gyroscopes, cameras or other image sensors, light sensors, microphones or other sound sensors, or any other suitable sensors. In particular, the vehicle sensors 116A, 116B may be configured to capture telematics data associated with respective vehicles 115A, 115B. Telematics data may include, e.g., one or more of speed data, acceleration data, braking data, cornering data, object range distance data (e.g., following distance data), turn signal data, seatbelt use data, location data, phone use data, date/time data, weather data, road type data, or any other suitable vehicle telematics data. Although two vehicles 115A, 115B and two associated vehicle onboard computing devices 114A, 114B and sets of vehicle sensors 116A, 116B are shown in FIG. 1, any number of vehicles, vehicle onboard computing devices, and/or vehicle sensors may be included in various embodiments.

The vehicle onboard computing devices 114A, 114B may each respectively include one or more processors (not shown) such as one or more microprocessors, controllers, and/or any other suitable type of processor. The vehicle onboard computing devices 114A, 114B may each respectively further include a memory (not shown), e.g., volatile memory, non-volatile memory, etc., accessible by the respective one or more processors (e.g., via a memory controller). The respective one or more processors associated with each vehicle onboard computing device 114A, 114B may each interact with the respective memories to obtain, for example, computer-readable instructions stored in the respective memories. Additionally or alternatively, computer-readable instructions may be stored on one or more removable media (e.g., a compact disc, a digital versatile disc, removable flash memory, etc.) that may be coupled to each vehicle onboard computing device 114A, 114B to provide access to the computer-readable instructions stored thereon.

In particular, the computer-readable instructions stored on the respective memories of each vehicle onboard computing device 114A, 114B may include instructions for controlling the vehicle (e.g., controlling the braking, steering, headlights, cameras, or other components of the vehicle) in order to enable smart safety features such as, e.g., smart parking assistance, adaptive cruise control, adaptive headlights, blind spot monitoring, forward collision warning, automatic emergency braking, automatic emergency steering, lane-departure warning, lane centering, rear cross-traffic alerts, smart vehicle cameras, etc. For instance, the instructions may include instructions for controlling the respective vehicle 115A, 115B to enable smart safety features based upon inputs from the respective sensors 116A, 116B.

Furthermore, these instructions may include instructions for transmitting telematics data associated with respective vehicles 115A, 115B to the computing device 102 (e.g., via the network 104). Moreover, these instructions may include instructions for transmitting (e.g., via the network 104) indications of which smart safety features associated with the respective vehicle 115A, 115B were enabled or activated at various dates or times, either automatically or based upon a request from the computing device 102.

Furthermore the computing device 102 may include one or more processors 120 such as one or more microprocessors, controllers, and/or any other suitable type of processor. The computing device 102 may further include a memory 122 (e.g., volatile memory, non-volatile memory) accessible by the one or more processors 120, (e.g., via a memory controller). Additionally, the computing device may include a user interface 123.

The one or more processors 120 may interact with the memory 122 to obtain, for example, computer-readable instructions stored in the memory 122. Additionally or alternatively, computer-readable instructions may be stored on one or more removable media (e.g., a compact disc, a digital versatile disc, removable flash memory, etc.) that may be coupled to the computing device 102 to provide access to the computer-readable instructions stored thereon. In particular, the computer-readable instructions stored on the memory 122 may include instructions for executing various applications, such as, e.g., a machine learning model training application 124, an ontology generator 126, a vehicle build information translator 128, a smart safety feature effectiveness calculator 130, a search application 132, and/or a virtual portal application 134.

For example, the machine learning model training application 124 may train a machine learning model to group similar terminology from different OEMs, e.g., based upon similarities between descriptions of each term and/or based upon similarities between the terms themselves, using several known OEM-specific terms from each of a plurality of OEMs.

In general, training the machine learning model (and/or neural network model) may include establishing a network architecture, or topology, and adding layers that may be associated with one or more activation functions (e.g., a rectified linear unit, softmax, etc.), loss functions and/or optimization functions. Multiple different types of artificial neural networks may be employed, including without limitation, recurrent neural networks, convolutional neural networks, and deep learning neural networks. Data sets used to train the artificial neural network(s) may be divided into training, validation, and testing subsets; these subsets may be encoded in an N-dimensional tensor, array, matrix, or other suitable data structures. Training may be performed by iteratively training the network using labeled training samples. Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned", values.

In one embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or separately trained and operated in conjunction.

The ontology generator 126 may apply the trained machine learning model to the vehicle build information from the OEM databases 108A, 108B, 108C in order to generate an ontology model mapping similar or same smart safety features between OEMs to OEM-specific terminology describing each feature for the OEMs associated with OEM servers 106A, 106B, 106C.

The vehicle build information translator 128 may apply the ontology model to the vehicle build information from the OEM databases 108A, 108B, 108C to translate the vehicle build information each of the different OEMs into a common language (i.e., by translating OEM-specific terminology to OEM-agnostic terminology). For example, the vehicle build information stored in the OEM database 108A may use the OEM-specific term "lane change assist," to describe a blind spot detection smart safety feature, while the vehicle build information stored in the OEM database 108B may use the OEM-specific term "blind spot monitor" to describe a blind spot detection feature that is substantially the same, the OEM database 108C may use the OEM-specific term "blind spot info system" to describe the same blind spot detection feature, etc. The vehicle build information translator 128 may translate each of these terms to an OEM-agnostic term for the smart safety feature, e.g., "blind spot detection smart safety feature." In particular, the vehicle build information translator 128 may store the translated vehicle build information in a vehicle build information (VBI) database 135.

The smart safety feature effectiveness calculator 130 may use the translated vehicle build information from the VBI database 135, along with information obtained from a vehicle accident record database 136 storing indications of accident history associated with various vehicles, and/or vehicle telematics data from vehicle onboard computing devices 114A, 114B (e.g., indicative of vehicle collisions, indicative of which smart safety features were operating during vehicle collisions, etc.), to calculate effectiveness scores for each smart safety feature. For instance, an accident rate may be calculated for all vehicles associated with a particular OEM-agnostic term for a smart safety feature, and the effectiveness of the smart safety feature may be calculated based at least in part on this accident rate.

Moreover, in some examples, the smart safety feature effectiveness calculator 130 may calculate a score indicative of the relevance of a given smart safety feature's performance in particular accidents. For instance, this score may indicate whether the smart safety feature's performance was likely relevant to a particular accident or collision, and/or whether the smart safety feature was likely operating as intended during a particular accident or collision. Moreover, in some examples, the smart safety feature effectiveness calculator 130 may calculate a percentage of fault associated with each smart safety feature for a particular accident or collision.

The search application 132 may provide a search feature to be displayed to a user via, e.g., via a web interface or via the user interface 123. In one example, the search application 132 may receive user input indicating a vehicle identification number (VIN) to be searched, and may search the vehicle build information to locate a matching vehicle and its associated smart safety features. Accordingly, the search application 132 may cause the user interface 123 to display, based upon the user input, a listing of smart safety features associated with the VIN, e.g., as shown in FIG. 2A. As another example, the search application 132 may receive user input indicating a smart safety feature to be searched, and may cause the user interface 123 to display, based upon the user input, a listing of vehicles having the smart safety feature and/or a listing of vehicle identification numbers (VINs) associated with those vehicles, e.g., as shown in FIG. 2B. In some examples, the user may use any terminology (e.g., OEM-specific terminology or OEM-agnostic terminology) for the feature, and the ontology model may be used to translate the user's input into OEM-agnostic terminology for the feature. Accordingly, the search application 132 may search the vehicle build information using the OEM-agnostic terminology and locate results to be displayed to the user.

Figure 3:
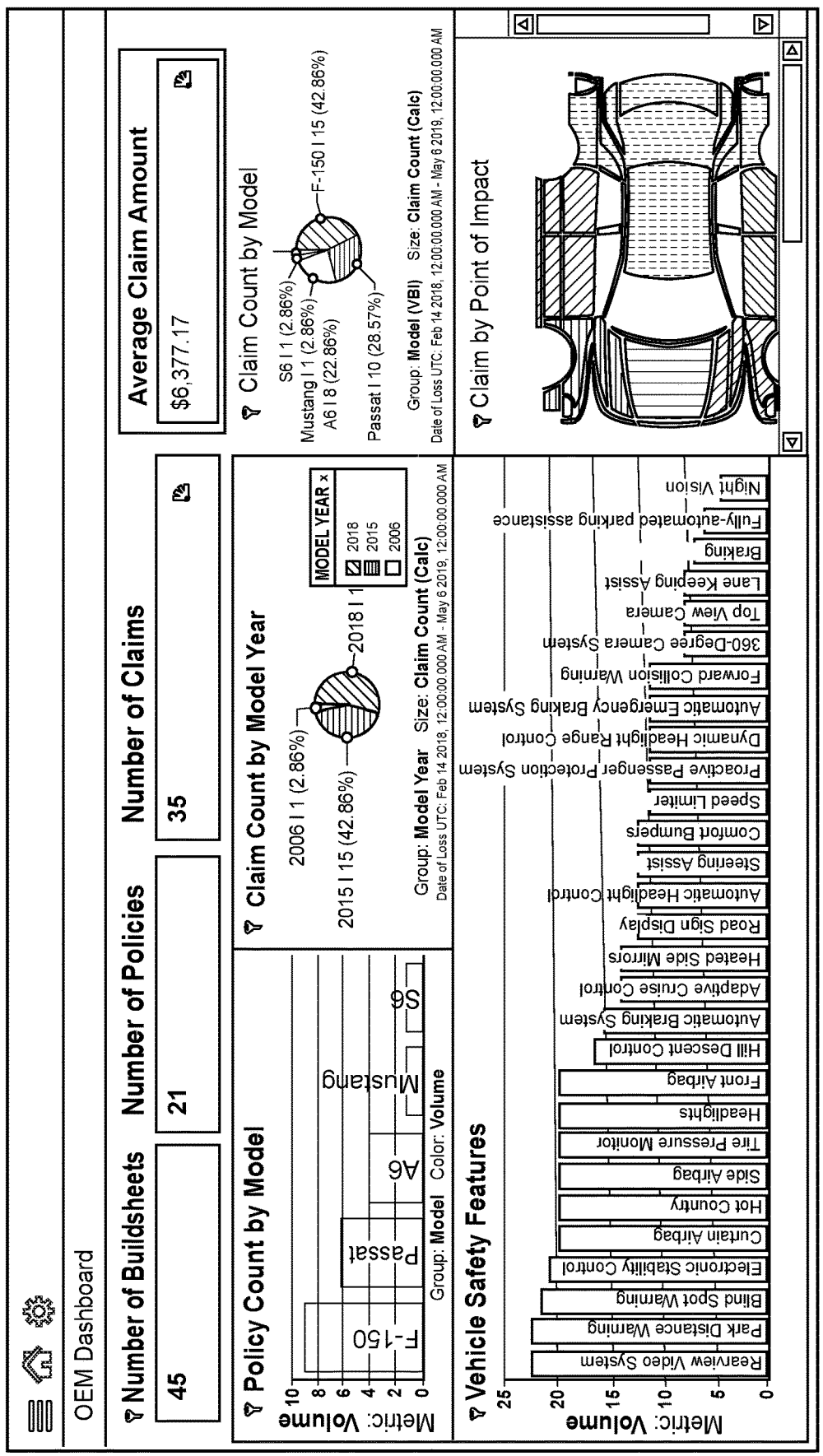
FIG. 3 illustrates an exemplary display of a user interface for a virtual portal for providing information about the performance of smart safety features to OEMs, in accordance with some embodiments.

The virtual portal application 134 may generate a virtual portal that provides information about the performance of various smart safety features and display the virtual portal to a user, e.g., via a web interface or via the user interface 123, e.g., as shown in FIG. 3. The virtual portal application 134 may cause the user interface 123 to display, for instance, smart feature effectiveness information and/or scores, as calculated by the smart safety feature effectiveness calculator 130.

Additionally, the virtual portal application 134 may cause the user interface 123 to display information related to various vehicle models manufactured by a particular OEM to a user associated with the OEM (e.g., a representative of the OEM). For instance, virtual portal application 134 may cause the user interface 123 to display an indication of a number of smart safety features associated with each vehicle model, a number of insurance policies associated with each vehicle model and/or associated with each smart safety feature, a number of insurance claims associated with each vehicle model and/or associated with each smart safety feature, a number of insurance claims associated with each vehicle model by year, etc. Moreover, the virtual portal application 134 may cause the user interface 123 to display an indication of a number of claims at each point of impact for a particular vehicle model and/or for a particular AVSF. This information may be displayed visually (e.g., by shading a portion of a diagram of a vehicle in different colors based upon the number of claims associated with that portion of the vehicle), or as a graph (e.g., in the form of a pie chart, bar graph, histogram, etc. illustrating a number of claims associated with various vehicle portions).

Moreover, the computer-readable instructions stored on the memory 122 may include instructions for carrying out any of the steps of the methods 400, 500, and 600 described in greater detail below with respect to FIGS. 4, 5, and 6, respectively. Furthermore, the computer-readable instructions stored on the memory 122 may include instructions for executing additional or alternative applications in various embodiments.

FIG. 2A illustrates an example of applying an ontology model to OEM-specific vehicle build information to generate translated vehicle build information, such that OEM-specific terminology associated with smart safety features is replaced with OEM-agnostic terminology for the smart safety features, in accordance with some embodiments. For instance, "lane change assist and lane keeping system," from the vehicle build sheet of a vehicle manufactured by a particular OEM, may be translated to the OEM-agnostic term "blind spot warning." In particular, FIG. 2A illustrates an example display of a user interface (e.g., user interface 123) showing the results of a search for a vehicle having a particular vehicle identification number (VIN). Accordingly, using this user interface, a user who looks up a particular VIN may see results indicating the OEM-agnostic terminology for smart safety features that are associated with the vehicle having the particular VIN.

FIG. 2B illustrates an exemplary display of a user interface (e.g., user interface 123) for searching for vehicles that have a particular type of smart safety feature, in accordance with some embodiments. When a user searches for a particular feature using the user interface shown in FIG. 2B, using OEM-agnostic terminology or any OEM-specific terminology for the feature, the user interface may display a listing of all vehicles (and/or the VINs associated therewith) associated with that feature. In other words, the user may use any terminology for the feature, and the ontology model may be used to translate the user's search into OEM-agnostic terminology for the feature. Accordingly, the translated vehicle build information may be searched to locate vehicles associated with the feature, and the VINs for vehicles associated with the feature may be displayed to the user.

For instance, in the context of an insurance provider, the search features shown at FIGS. 2A and 2B may be utilized, e.g., in order to analyze loss data for setting rates for vehicles with certain features, to apply rating groups based upon vehicle features, to verify the presence of vehicle features for claim processing and/or fraud-detection purposes, and to analyze the effectiveness and/or performance of various vehicle features.

FIG. 3 illustrates an exemplary display of a user interface (e.g., user interface 123) for a virtual portal for providing information about the performance of smart safety features to OEMs, in accordance with some embodiments. For example, using the user interface shown, information related to various vehicle models manufactured by the OEM may be displayed for an OEM user (e.g., a representative of the OEM). For instance, the user interface may display an indication of a number of smart safety features associated with each vehicle model, a number of insurance policies associated with each vehicle model and/or associated with each smart safety feature, a number of insurance claims associated with each vehicle model and/or associated with each smart safety feature, a number of insurance claims associated with each vehicle model by year, etc.

The user interface shown in FIG. 3 may further display an indication of a number of claims at each point of impact for a particular vehicle model and/or for a particular smart safety feature. This information may be displayed visually (e.g., by shading a portion of a diagram of a vehicle in different colors based upon the number of claims associated with that portion of the vehicle), or as a graph (e.g., in the form of a pie chart, bar graph, histogram, etc. illustrating a number of claims associated with various vehicle portions).

For instance, in the context of an OEM, the virtual portal shown at FIG. 3 may be utilized, e.g., in order to inform future vehicle design decisions of vehicle feature sets, to understand the effectiveness of vehicle features and/or repair costs, and/or to factor insurance costs into the "total cost of ownership" for their vehicles.

Exemplary Safety Effectiveness Determination

Figure 4:
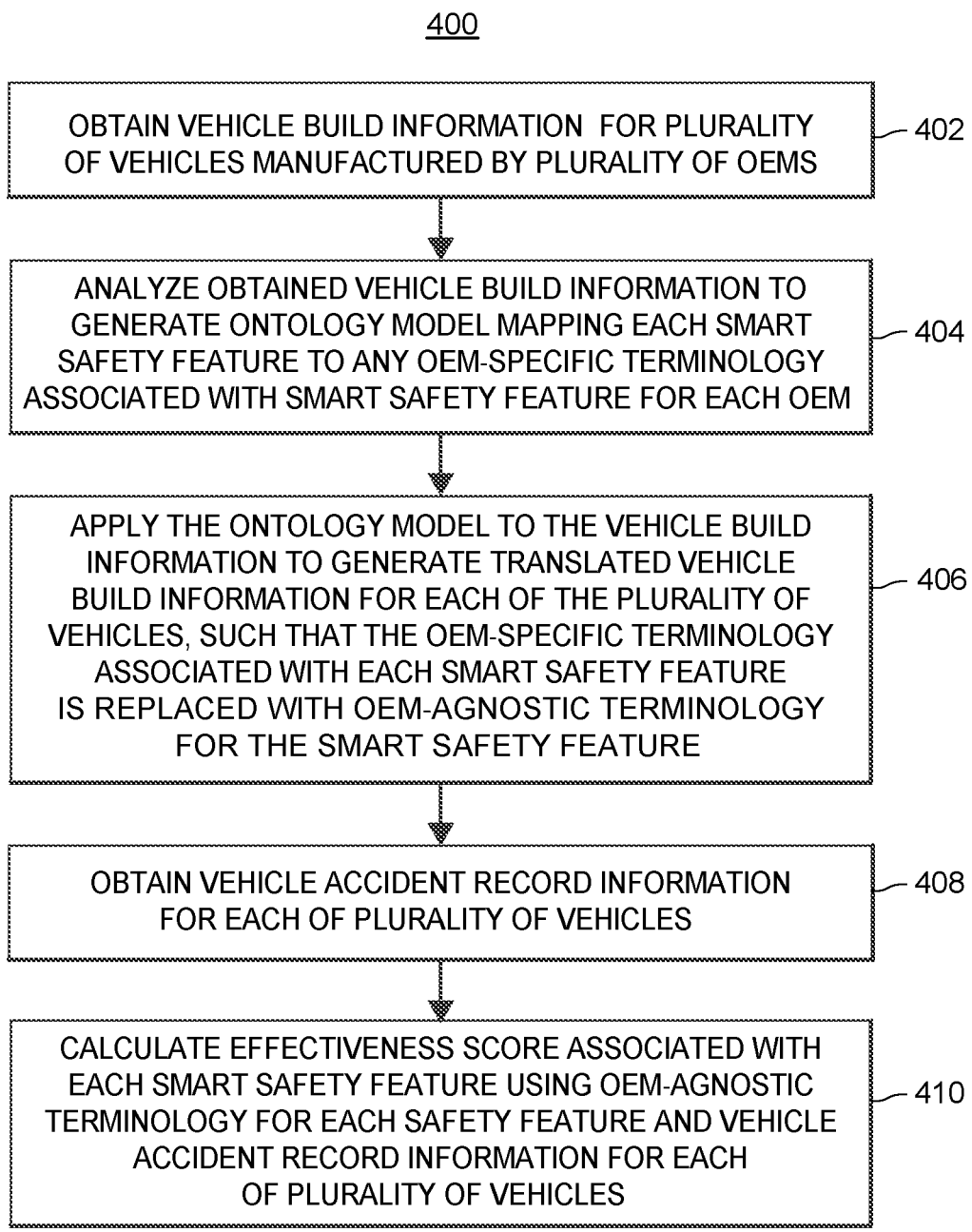
FIG. 4 illustrates a flow diagram of an exemplary computer-implemented method for determining the effectiveness of vehicle safety features, in accordance with some embodiments.

FIG. 4 illustrates a flow diagram of an exemplary method 400 for determining the effectiveness of vehicle safety features, in accordance with some embodiments. One or more steps of the method 400 may be implemented as a set of instructions stored on a computer-readable memory and executable on one or more processors. While "smart safety features" are discussed herein, the method 400 may be applied to determine the effectiveness of any kind of vehicle safety features.

Vehicle build information for a plurality of vehicles manufactured by a plurality of OEMs may be obtained (block 402), e.g., from databases associated with each OEM. For example, the vehicle build information obtained from each OEM may include information from vehicle build sheets for each individual vehicle manufactured by that OEM, with each vehicle build sheet listing all features of the individual vehicle.

The vehicle build information may contain, for instance OEM-specific terminology associated with one or more smart safety features associated with each vehicle. For instance, a first OEM may use the terminology "lane change assist" for a blind spot detection smart safety feature, while a second OEM may use the terminology "blind spot info system," and a third OEM may use the terminology "blind spot monitor," for essentially the same blind spot detection smart safety feature. As another example, a first OEM may use the terminology "adaptive cruise assist" for an adaptive cruise control feature, while a second OEM may use the terminology "predictive cruise control," and a third OEM may use the terminology "active cruise control," for essentially the same adaptive cruise control feature. Consequently, in some examples, vehicle build sheets for vehicles manufactured by different OEMs may each have different OEM-specific terminology for the essentially the same smart safety features.

The obtained vehicle build information may be analyzed (block 404) by a processor to generate an ontology model mapping each smart safety feature to any OEM-specific terminology associated with the smart safety feature for each OEM. For instance, the ontology model may map the OEM-specific terms: "lane change assist," "blind spot info system," and "blind spot monitor" to the smart safety feature of blind spot detection. As another example, the ontology model may map "adaptive cruise assist," "predictive cruise control," and "active cruise control," to the smart safety feature of adaptive cruise control.

In some examples, a machine learning model may be trained using OEM-specific terminology associated with each of a plurality of known smart safety features for a plurality of OEMs. For instance, machine learning or natural language processing may be used to group similar terminology from different OEMs, e.g., based upon similarities between descriptions of each term and/or based upon similarities between the terms themselves. The trained machine learning model may be applied to the obtained vehicle build information in order to identify OEM-specific terminology associated with each smart safety feature for each OEM.

The ontology model may be applied (block 406) to the vehicle build information (e.g., as shown in FIG. 2A) to generate translated vehicle build information for each of the plurality of vehicles, such that the OEM-specific terminology associated with each smart safety feature is replaced with OEM-agnostic terminology for the smart safety feature. For instance, wherever OEM-specific terms such as "the OEM-specific terms: "lane change assist," "blind spot info system," and "blind spot monitor" appear in the vehicle build information for each of the plurality of vehicles, these terms may be replaced with an OEM-agnostic term (e.g., "blind spot detection feature"). Similarly, wherever OEM-specific terms such as "adaptive cruise assist," "predictive cruise control," and "active cruise control," appear in the vehicle build information for each of the plurality of vehicles, these terms may be replaced with an OEM-agnostic term (e.g., "adaptive cruise control feature"). Accordingly, the terminology used in the vehicle build information associated with each vehicle may be standardized such that the vehicle build information for each of the plurality of vehicles uses the same OEM-agnostic terminology when referring to features that are the same or essentially the same.

Vehicle accident record information may be obtained (block 408) for each of the plurality of vehicles. The vehicle accident record information may include, e.g., a number of accidents, a frequency of accidents, or a severity of accidents associated with each of the plurality of vehicles. Moreover, the vehicle accident record information may include dates and/or times associated with accidents associated with each of the plurality of vehicles.

An effectiveness score may be calculated (block 410) for each smart safety feature using the OEM-agnostic terminology for each smart safety feature associated with each vehicle and the vehicle accident record information for each vehicle. That is, by using OEM-agnostic terminology, effectiveness scores may be calculated for particular types of safety features present in vehicles manufactured by a variety of different OEMs. For instance, the effectiveness of blind spot detection features in general may be calculated for a plurality of vehicles associated with various OEMs. In some examples, these effectiveness scores may be generated or scored as percentages (e.g., 88% effective, 50% effective), or on a numerical scale (e.g., on a scale of 1-10).

Generally speaking, a higher effectiveness score may be calculated for smart safety features that are associated with vehicles that have fewer, less frequent, and/or less severe accidents or collisions. In some examples, calculating the effectiveness score may include obtaining vehicle telematics data and/or other data indicating whether smart safety features were activated and/or enabled at various dates or times for each of the plurality of vehicles. For instance, the vehicle telematics data and the vehicle accident record information for each vehicle may be used to determine whether a smart safety feature was activated or deactivated at a date and/or time associated with a vehicle accident.

Additionally, if a smart safety feature of a vehicle was deactivated at a date and/or time of an accident associated with the vehicle, then the data from that accident may not be included in the calculation of the effectiveness score for that smart safety feature, but if the smart safety feature was activated at the date and/or time of the accident, then the data from that accident may be included in the calculation of the effectiveness score for that smart safety feature. In some examples, the telematics data may be used to determine whether a smart feature was updated prior to a date and/or time associated with a vehicle accident, and/or when the smart feature was last updated prior to the accident, and this determination may be factored into the calculation of the effectiveness score for the smart safety feature.

Additionally, in some examples, calculating the effectiveness score may be based on an operational design domain of the safety feature, the road upon which the vehicle was operating and/or the environment in which the vehicle was operating at the date and/or time of the accident. Generally speaking, an operational design domain for a safety feature may include operating conditions under which the safety feature is specifically designed to function, including, but not limited to, environmental, geographical, and time-of-day restrictions, and/or the requisite presence or absence of certain traffic or roadway characteristics. For instance, an effectiveness score may be calculated for a specific safety feature in a specific driving environment. For instance, in some examples, the effectiveness score for a given safety feature may be calculated differently for vehicles operating on a divided highway than for vehicles operating on a city street. As another example, an effectiveness score may be calculated for a specific safety feature at night compared to during the day, on roads with a steep incline compared to flat roads, or for various other operational design domains.

Furthermore, in some examples, an effectiveness score may be calculated for a combination of smart safety features. For instance, in some examples, two or more smart safety features may be particularly effective when used in combination. Accordingly, individual effectiveness scores may be calculated for individual smart safety features, while combined effectiveness scores may be calculated for certain combinations of smart safety features. For example, a combined effectiveness score may be calculated for vehicles having both a blind spot detection feature and an adaptive cruise control feature.

Moreover, in some examples, the method 400 may include determining an insurance rating for a particular vehicle based upon the effectiveness scores associated with each smart safety feature associated with the vehicle, and/or based upon a particular combination of smart safety features associated with the vehicle. For example, insurance customers who own vehicles that have smart safety features with high effectiveness scores may be eligible for lower rates, or for certain discounts.

With the foregoing, an insurance customer may opt-in to a rewards, insurance discount, or other type of program. After the insurance customer provides their affirmative consent, an insurance provider remote server may collect data from the customer's mobile device, smart home controller, or other smart devices—such as with the customer's permission or affirmative consent. The data collected may be related to insured assets before (and/or after) an insurance-related event, including those events discussed elsewhere herein. In return, risk averse insureds may receive discounts or insurance cost savings related to home, renters, personal articles, auto, life, health, and other types of insurance from the insurance provider.

In one aspect, data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

Exemplary Computer-Implemented Methods

Figure 5:
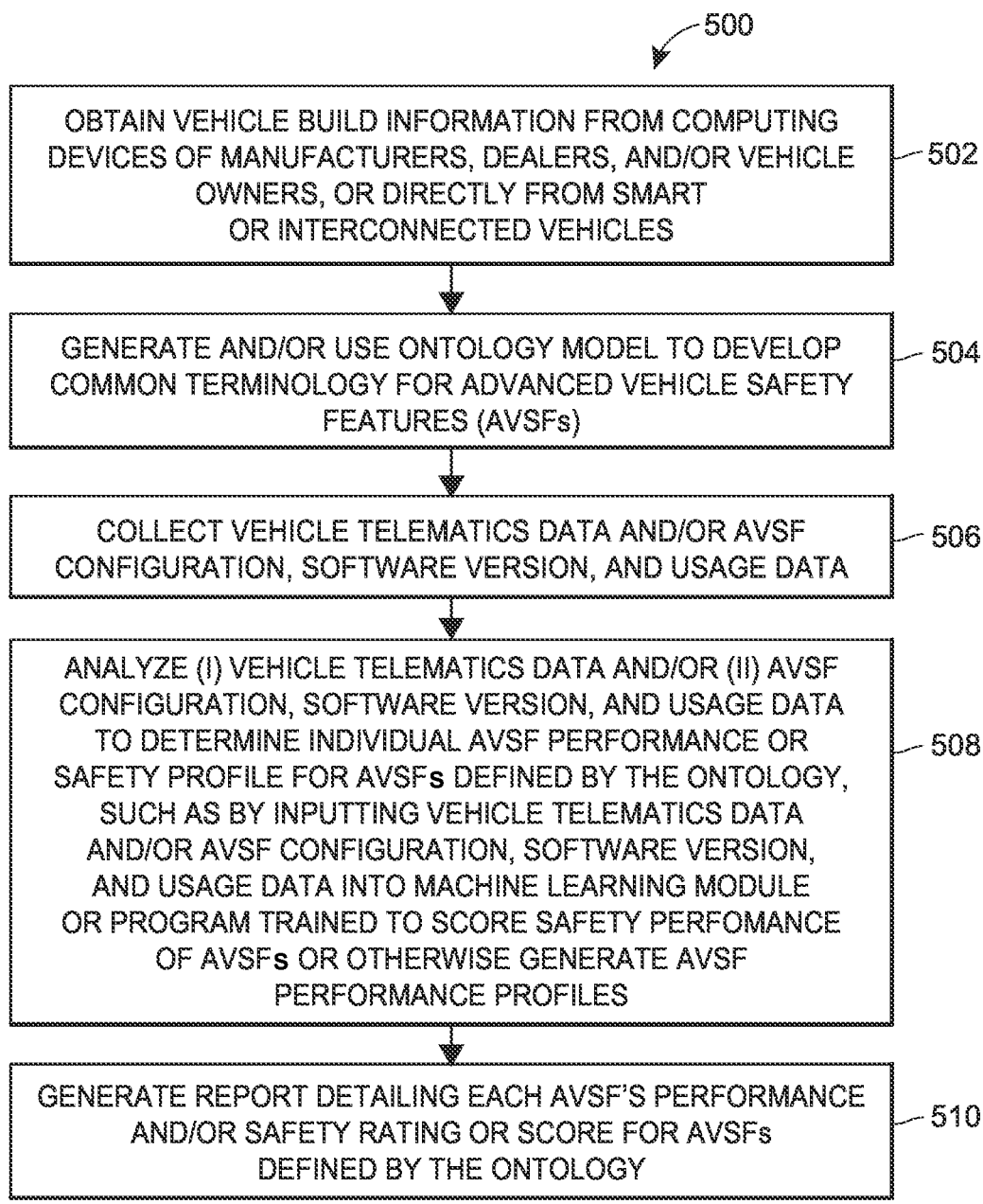
FIG. 5 illustrates an exemplary computer-implemented method of analyzing performance of advanced vehicle safety features.

FIG. 5 illustrates an exemplary computer-implemented method of analyzing performance of advanced vehicle safety features 500. The method 500 may include, via one or more local or remote processors and/or associated transceivers, obtaining, collecting, or receiving (such as via wireless communication or data transmission over one or more radio frequency links) vehicle build information for multiple automobiles from computing devices associated from vehicle manufacturers, dealerships, repair shops, and/or vehicle owners, or directly from smart vehicles, autonomous vehicles, and/or other vehicles configured for wireless communication with other computing devices 502. The vehicle build information may include one or more advanced vehicle safety features (AVSFs) as described and discussed elsewhere herein.

The method 500 may include, via one or more processors and/or associated transceivers, generating and/or using an ontology module to develop a common terminology for advanced vehicle safety features (AVSFs) 504, such as described and detailed elsewhere herein. For instance, different OEMs may use different terminology for similar vehicle safety features. The ontology may convert the different terminology from the OEMs into a common vocabulary.

The method 500 may include, via one or more processors and/or associated transceivers, collecting or receiving (such as via wireless communication or data transmission from a driver or passenger mobile device or a vehicle controller/transceiver over one or more radio frequency links) (i) vehicle telematics data (associated with individual vehicle operation, such as speed, acceleration, cornering, braking, location, etc.), and/or (ii) AVSF configuration, software version, and/or usage data 506.

The AVSF configuration data may include various settings of an AVSF established or set by a vehicle owner. The AVSF software version data may include a version of software or current version of software installed on the AVSF or AVSF memory unit. The AVSF usage data may include data detailing whether and to what extent the AVSF is or was used on a given day or trip. For instance, some vehicle owners may decide not to employ or rely upon advanced vehicle safety features, while other vehicle owners may always use or employ the AVSFs available to them or installed on their vehicles.

The method 500 may include, via one or more processors, analyzing (i) the vehicle telematics data, and/or (ii) the AVSF configuration, software version, and/or usage data to determine an individual advanced vehicle safety feature performance or safety profile for AVSFs defined by the ontology 508. In one embodiment, the vehicle telematics data, and/or the AVSF configuration, software version, and/or usage data may be input into a machine learning program, module, model, or algorithm trained to determine an AVSF performance or safety profile or score based upon vehicle telematics data, and/or AVSF configuration, software version, and/or usage data. As an example, when a processor determines that an AVSF is in use, vehicle operation may be monitored to determine whether the AVSF and/or vehicle is operating or performing as expected or designed. The AVSF, and/or the safety performance thereof, may then be assigned a score and a performance profile of the AVSF updated.

In general, training the machine learning model (or neural network model) may include establishing a network architecture, or topology, and adding layers that may be associated with one or more activation functions (e.g., a rectified linear unit, softmax, etc.), loss functions and/or optimization functions. Multiple different types of artificial neural networks may be employed, including without limitation, recurrent neural networks, convolutional neural networks, and deep learning neural networks. Data sets used to train the artificial neural network(s) may be divided into training, validation, and testing subsets; these subsets may be encoded in an N-dimensional tensor, array, matrix, or other suitable data structures. Training may be performed by iteratively training the network using labeled training samples. Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned", values.

In one embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or separately trained and operated in conjunction.

The method 500 may include, via one or more processors, generating a virtual report detailing each AVSF's performance and/or safety rating or score for AVSFs defined by the ontology 510. The virtual report may be shared with vehicle owners, dealerships, repair shops, and/or OEMs via a website or virtual portal. The method 500 may include additional, less, or alternate actions, including those discussed elsewhere herein.

Figure 6:
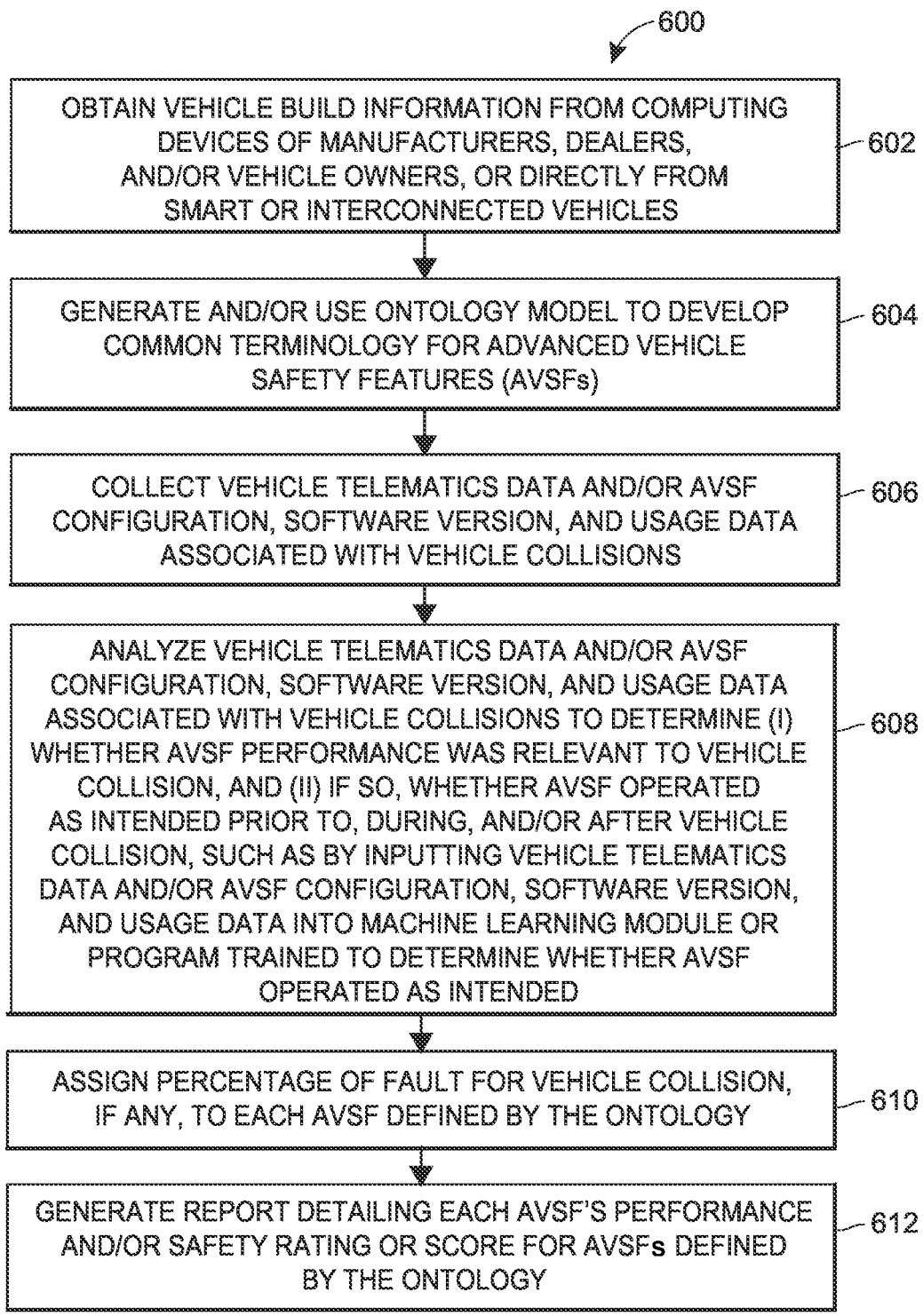
FIG. 6 illustrates another exemplary computer-implemented method of analyzing performance of advanced vehicle safety features.

FIG. 6 illustrates another exemplary computer-implemented method of analyzing performance of advanced vehicle safety features 600. The method 600 may include, via one or more processors and/or associated transceivers, obtaining, collecting, or receiving vehicle build information for multiple automobiles from computing devices associated from vehicle manufacturers, dealerships, repair shops, and/or vehicle owners, or directly from smart vehicles, autonomous vehicles, and/or other vehicles configured for wireless communication with other computing devices 602, such as described with respect to FIG. 5 above. Also as discussed with respect to FIG. 5 above, the method 600 may include, via one or more processors and/or associated transceivers, generating and/or using an ontology module to develop a common terminology for advanced vehicle safety features (AVSFs) 604.

The method 600 may include, via one or more processors and/or associated transceivers, collecting or receiving (such as via wireless communication or data transmission from a driver or passenger mobile device or a vehicle controller/transceiver over one or more radio frequency links) (i) vehicle telematics data (associated with individual vehicle operation, such as speed, acceleration, cornering, braking, location, etc.) associated with (such as collected prior to, during, and/or after) a vehicle collision, and/or (ii) AVSF configuration, software version, and/or usage data associated with (such as collected prior to, during, and/or after) a vehicle collision 606.

As noted above during the discussion of FIG. 5, the AVSF configuration data may include various settings of an AVSF established or set by a vehicle owner. The AVSF software version data may include a version of software or current version of software installed on the AVSF or AVSF memory unit. The AVSF usage data may include data detailing whether and to what extent the AVSF is or was used on a given day or trip. For instance, some vehicle owners may decide not to employ or rely upon advanced vehicle safety features, while other vehicle owners may always use or employ the AVSFs available to them or installed on their vehicles.

The method 600 may include, via one or more processors, analyzing (i) the vehicle telematics data associated with a vehicle collision, and/or (ii) the AVSF configuration, software version, and/or usage data associated with the vehicle collision to determine an individual advanced vehicle safety feature performance or safety profile for AVSFs defined by the ontology 608. In one embodiment, the vehicle telematics data associated with the vehicle collision, and/or the AVSF configuration, software version, and/or usage data associated with the vehicle collision may be input into a machine learning program, module, model, or algorithm trained to determine an AVSF performance or safety profile or score based upon vehicle telematics data associated with the vehicle, and/or AVSF configuration, software version, and/or usage data associated with the vehicle collision. As an example, when a processor determines that an AVSF is in use, vehicle operation may be monitored to determine whether the AVSF and/or vehicle is operating or performing as expected or designed prior to, during, and/or after a vehicle collision.

As an example, when a processor determines that an AVSF is in use, vehicle operation may be monitored to determine whether the performance of the AVSF was relevant to a collision. For instance, determining whether the AVSF and/or vehicle is operating or performing as expected or designed prior to, during, and/or after the vehicle collision may include inputting vehicle telematics data and/or AVSF configuration, software version, and usage data into machine learning module or program trained to determine whether the AVSF and/or vehicle is operating or performing as expected or designed. Similarly, determining whether the performance of the AVSF was relevant to the collision may include inputting vehicle telematics data and/or AVSF configuration, software version, and usage data into machine learning module or program trained to determine whether the performance of the AVSF was relevant to the collision. The AVSF, and/or the safety performance thereof, may then be assigned a score and a performance profile of the AVSF updated.

As discussed above with respect to FIG. 5, in general, training the machine learning model (or neural network model) may include establishing a network architecture, or topology, and adding layers that may be associated with one or more activation functions (e.g., a rectified linear unit, softmax, etc.), loss functions and/or optimization functions. Multiple different types of artificial neural networks may be employed, including without limitation, recurrent neural networks, convolutional neural networks, and deep learning neural networks. Data sets used to train the artificial neural network(s) may be divided into training, validation, and testing subsets; these subsets may be encoded in an N-dimensional tensor, array, matrix, or other suitable data structures. Training may be performed by iteratively training the network using labeled training samples. Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned", values.

In one embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or separately trained and operated in conjunction.

The method 600 may include, via one or more processors, assigning a percentage of fault for a vehicle collision to each AVSF defined by the ontology based upon the analysis of the telematics data and AVSF data associated with the vehicle collision or collisions. After which, as discussed with FIG. 5, the method 600 may include, via one or more processors, generating a virtual report detailing each AVSF's performance and/or safety rating or score for AVSFs defined by the ontology 612. The virtual report may be shared with vehicle owners, dealerships, repair shops, and/or OEMs via a website or virtual portal. The method 600 may include additional, less, or alternate actions, including those discussed elsewhere herein.

Exemplary Advanced Vehicle Safety Feature Analysis

In one aspect, a computer-implemented method for determining the effectiveness of vehicle safety features may be provided. The method may include (1) obtaining, collecting, or receiving, by one or more processors and/or associated transceivers (such as via wireless communication or data transmission over one or more radio frequency links), vehicle build information for a plurality of vehicles manufactured by a plurality of original equipment manufacturers (OEMs), the vehicle build information containing OEM-specific terminology associated with one or more smart safety features associated with each vehicle (or advanced vehicle safety features (AVSFs)); (2) generating or using, via the one or more processors, an ontology or ontology model to develop a common terminology for the AVSFs or one or more smart safety features; (3) collecting or receiving, via the one or more processors and/or associated transceivers (such as via wireless communication or data transmission over one or more radio frequency links), vehicle telematics data and/or AVSF data from a mobile device associated with a vehicle owner or a vehicle controller or transceiver; and/or (4) analyzing, via the one or more processors, the vehicle telematics data and/or AVSF data to determine an individual AVSF performance rating or safety score for each AVSF defined by the ontology or ontology model. The method may include additional, less, or alternate actions, including those discussed elsewhere herein.

For instance, the method may include generating a virtual report detailing the individual AVSF performance rating or safety score for each AVSF in or defined by the ontology. The method may also include publishing the virtual report or otherwise making the virtual report available via a virtual portal.

In some embodiments, the AVSF data may be AVSF configuration, software, and/or usage data. Additionally or alternatively, the AVSF data may include or detail vehicle owner preferences for AVSF configurations and usage. The AVSF data may include software version information of a current software version installed or executing on the AVSF. The AVSF may be an autonomous or semi-autonomous vehicle feature, technology, or system.

The vehicle telematics data may include speed, acceleration, cornering, braking, location, and time of day information. Analyzing, via the one or more processors, the vehicle telematics data and/or AVSF data to determine an individual AVSF performance rating or safety score may include inputting the vehicle telematics data and/or AVSF data into a machine learning program, module, model, or algorithm trained to generate an AVSF performance rating or safety score based upon vehicle telematics data and/or AVSF data.

In another aspect, a computer system configured to determine the effectiveness of vehicle safety features may be provided. The computer system may include one or more processors, servers, and/or associated transceivers configured to: (1) obtain, collect, or receive, such as via wireless communication or data transmission over one or more radio frequency links, vehicle build information for a plurality of vehicles manufactured by a plurality of original equipment manufacturers (OEMs), the vehicle build information containing OEM-specific terminology associated with one or more smart safety features associated with each vehicle (or advanced vehicle safety features (AVSFs)); (2) generate or use an ontology or ontology model to develop a common terminology for the AVSFs or one or more smart safety features; (3) collect or receive, such as via wireless communication or data transmission over one or more radio frequency links, vehicle telematics data and/or AVSF data from a mobile device associated with a vehicle owner or a vehicle controller or transceiver; and/or (4) analyze the vehicle telematics data and/or AVSF data to determine an individual AVSF performance rating or safety score for each AVSF defined by the ontology or ontology score.

The one or more processors may be further configured to generate a virtual report detailing the individual AVSF performance rating or safety score for each AVSF in or defined by the ontology. The one or more processors may be configured to input the vehicle telematics data and/or AVSF data into a machine learning program, module, model, or algorithm trained to generate an AVSF performance rating or safety score based upon vehicle telematics data and/or AVSF data. The computer system may include additional, less, or alternate functionality, including that discussed elsewhere herein.

In another aspect, a computer-implemented method for determining the effectiveness of vehicle safety features may be provided. The method may include (1) obtaining, collecting, or receiving, by one or more processors and/or associated transceivers (such as via wireless communication or data transmission over one or more radio frequency links), vehicle build information for a plurality of vehicles manufactured by a plurality of original equipment manufacturers (OEMs), the vehicle build information containing OEM-specific terminology associated with one or more smart safety features associated with each vehicle (or advanced vehicle safety features (AVSFs)); (2) generating or using, via the one or more processors, an ontology or ontology model to develop a common terminology for the AVSFs or one or more smart safety features; (3) collecting or receiving, via the one or more processors and/or associated transceivers (such as via wireless communication or data transmission over one or more radio frequency links), vehicle telematics data associated with a vehicle collision and/or AVSF data associated with the vehicle collision, such as from a mobile device associated with a vehicle owner or a vehicle controller or transceiver; and/or (4) analyzing, via the one or more processors, the vehicle telematics data associated with the vehicle collision and/or AVSF data associated with the vehicle collision to determine an individual AVSF performance rating or safety score for each AVSF defined by the ontology or ontology model.

The method may include generating a virtual report detailing the individual AVSF performance rating or safety score for each AVSF in or defined by the ontology. The method may include inputting the vehicle telematics data associated with the vehicle collision and/or AVSF data associated with the vehicle collision into a machine learning program, module, model, or algorithm trained to generate an AVSF performance rating or safety score based upon vehicle telematics data and/or AVSF data. The vehicle telematics data and/or AVSF data may be generated or collected before, during, and/or after a vehicle collision. The method may include additional, less, or alternate actions, including those discussed elsewhere herein.

In another aspect, a computer system configured to determine the effectiveness of vehicle safety features may be provided. The computer system may include one or more processors, servers, and/or associated transceivers configured to: (1) obtain, collect, or receive, such as via wireless communication or data transmission over one or more radio frequency links, vehicle build information for a plurality of vehicles manufactured by a plurality of original equipment manufacturers (OEMs), the vehicle build information containing OEM-specific terminology associated with one or more smart safety features associated with each vehicle (or advanced vehicle safety features (AVSFs)); (2) generate or use an ontology or ontology model to develop a common terminology for the AVSFs or one or more smart safety features; (3) collect or receive, such as via wireless communication or data transmission over one or more radio frequency links, vehicle telematics data associated with the vehicle collision and/or AVSF data associated with the vehicle collision, such as from a mobile device associated with a vehicle owner or a vehicle controller or transceiver; and/or (4) analyze the vehicle telematics data associated with the vehicle collision and/or AVSF data associated with the vehicle collision to determine an individual AVSF performance rating or safety score. The computer system may be configured to input the vehicle telematics data and/or AVSF data into a machine learning program, module, model, or algorithm trained to generate an AVSF performance rating or safety score based upon vehicle telematics data and/or AVSF data. The computer system may include additional, less, or alternate functionality, including that discussed elsewhere herein.

Exemplary System for Calculating Update Effectiveness Score

Many companies update features on vehicles that they have sold. The update may be in the form of computer software, computer hardware, physical vehicle component(s), or any combination thereof. For example, a company may produce an update to a forward collision warning system that makes the forward collision warning system more sensitive, or better at detecting an oncoming collision in bright sunlight or during rain. However, once the update has been implemented, it may be difficult to determine if the update has been effective (e.g., if making the forward collision warning system more sensitive is effective). Thus, what is needed is a system that may determine the effectiveness of a vehicle update.

Figure 7:
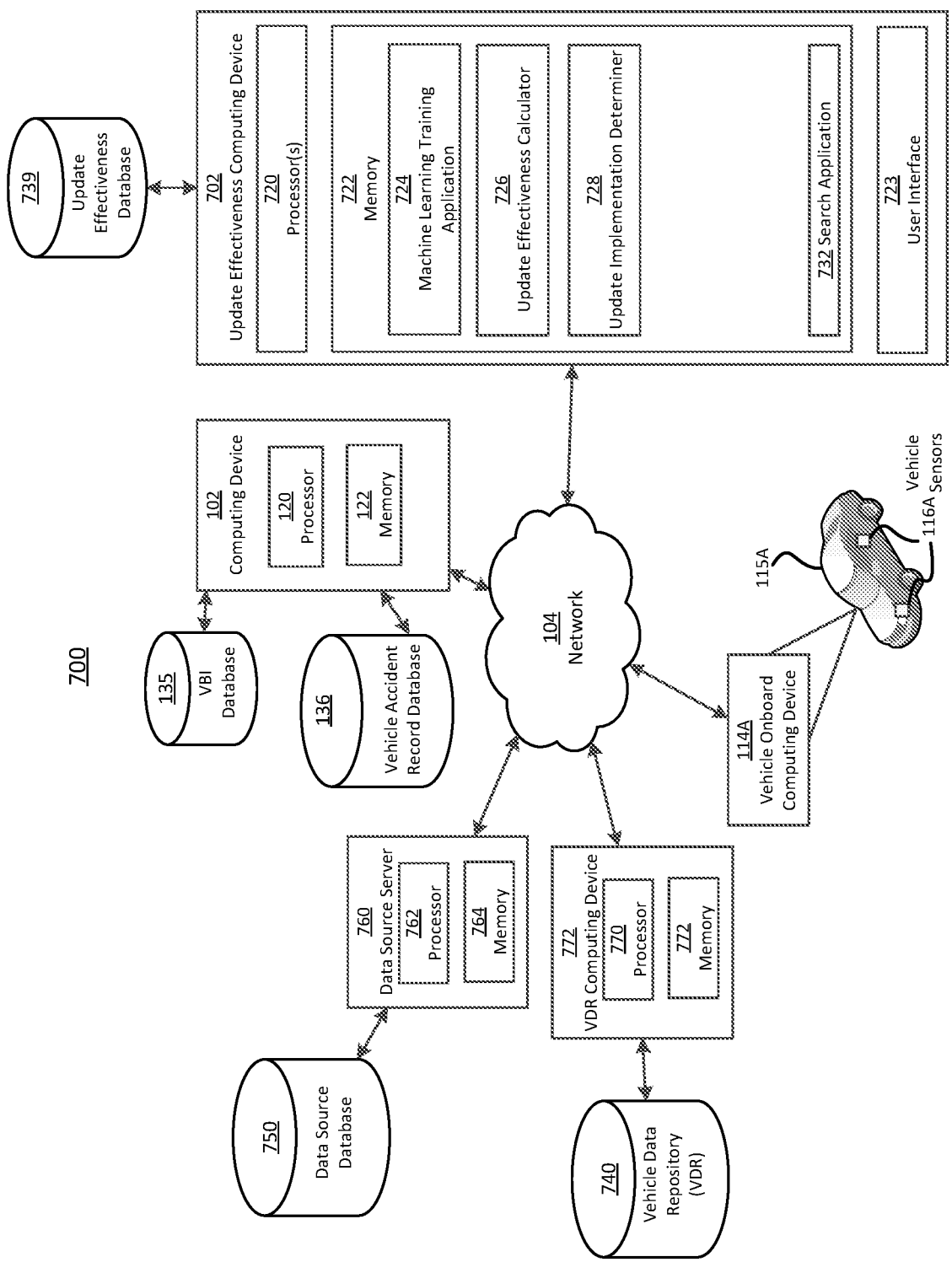
FIG. 7 illustrates an exemplary computer system for calculating an effectiveness of an update to a vehicle feature.

Such a computer system is provided in the example of FIG. 7, which illustrates an exemplary computer system 700 for calculating effectiveness of an update to a vehicle feature, in accordance with some embodiments. The high-level architecture illustrated in FIG. 7 may include both hardware and software applications, as well as various data communications channels for communicating data between the various hardware and software components, as is described below. The system may include a computing device 102, VBI database 135, vehicle 115A, and network 104, as described above (e.g., as described with respect to FIG. 1). In this respect, in some embodiments, the example of FIG. 7 is an extension of the example of FIG. 1. Moreover, although the example of FIG. 7 illustrates only one of each of many of the components, such as the computing device 102, the VDR computing device 772, the vehicle 115A, and the data source database 750, etc., any number of each of the components may be included in a system (e.g., multiple data source databases, multiple vehicles, etc.).

The system 700 may include an update effectiveness computing device 702, which may include one or more processors 720 such as one or more microprocessors, controllers, and/or any other suitable type of processor. The update effectiveness computing device 702 may further include a memory 722 (e.g., volatile memory, non-volatile memory) accessible by the one or more processors 720, (e.g., via a memory controller). Additionally, the update effectiveness computing device 702 may include a user interface 723.

The one or more processors 720 may interact with the memory 722 to obtain, for example, computer-readable instructions stored in the memory 722. Additionally or alternatively, computer-readable instructions may be stored on one or more removable media (e.g., a compact disc, a digital versatile disc, removable flash memory, etc.) that may be coupled to the update effectiveness computing device 702 to provide access to the computer-readable instructions stored thereon. In particular, the computer-readable instructions stored on the memory 722 may include instructions for executing various applications, such as, e.g., a machine learning model training application 724, update effectiveness calculator 726, and/or update implementation determiner 728.

In general, the update effectiveness calculator 726 may calculate an effectiveness score for an update to a vehicle. For example, the update effectiveness calculator 726 may construct a first dataset with data from before the update was sent to or implemented in vehicles having the vehicle feature, and construct a second dataset with data from after the update was sent to or implemented in the vehicles having the vehicle feature. The update effectiveness calculator 726 may then calculate an effectiveness score of the update based on both the first data set and the second dataset. In some implementations, the effectiveness score is calculated using a machine learning algorithm (e.g., trained and/or executed by the machine learning training application 724, as will be described elsewhere herein).

Once calculated, the effectiveness score may be stored in the memory 722. Additionally or alternatively, the effectiveness score may be stored in the update effectiveness database 739, which may store any suitable data. For example, the update effectiveness database 739 may store effectiveness scores, vehicle build sheets, standardized vehicle build sheets, any datasets (e.g., the first and second datasets from before and after an update was implemented), vehicle feature information (e.g., dates/times vehicle features were implemented, specifics of vehicle features, subscription information, infotainment system button placement information, etc.), historical weather condition information, insurance claim information, accident information (e.g., a number of accidents, a frequency of accidents, or a severity of accidents), etc.

In some scenarios, it may not be readily apparent if an update has been implemented in a vehicle. For example, a company may push a software update to vehicle 115A, but the user of the vehicle may have to then manually activate the update for the update to be implemented. In another example, a user may have to activate the feature that the update applies to. For instance, if the update is for a lane change assist feature, the update may only be implemented when the user is driving with the lane change assist feature activated. In this regard, the update implementation determiner 728 may determine when an update has been implemented.

In addition, the update effectiveness computing device 702 may also include a search application 732, which may provide a search feature to be displayed to a user via, e.g., via a web interface or via the user interface 723. In one example, the search application 732 may receive user input indicating a vehicle feature to be searched, and may search the update effectiveness database 739 for effectiveness score(s) and/or any other data of the vehicle feature. In another example, the search application 732 may receive user input indicating a vehicle identification number (VIN) to be searched, and may search the vehicle build information to locate a matching vehicle and its associated standardized build sheet (e.g., constructed by the standardized build vehicle data repository (VDR) computing device 772, as will be described further below) to thereby display the associated information.

To calculate the effectiveness score, the update effectiveness computing device 702 may use data from any suitable source. For example, the update effectiveness computing device 702 may receive data from any of the data source database 750, the vehicle 115A, the VDR computing device 772, the computing device 102, etc.

The data source database 750 may hold any suitable data. Examples of the data held by the data source database 750 include data from before an update was sent to or implemented in the vehicles having the vehicle feature, data from after the update was sent to or implemented in the vehicles having the vehicle feature, vehicle information (e.g., year/make/model of the vehicle, safety feature information, accident record information, ownership information, etc.). Examples of the data source database 750 include a vehicle manufacturer's database, a governmental database, a third party aggregator, an insurance company database, a National Highway Traffic Safety Administration (NHTSA) information database, a Highway Loss Data Institute (HLDI) information database, an Insurance Institute for Highway Safety (IIHS) database, etc.

Furthermore, the data source database 750 may be connected to a data source server 760, which may include one or more processors 762, such as one or more microprocessors, controllers, and/or any other suitable type of processor. The data source server 760 may further include a memory 764 (e.g., volatile memory, non-volatile memory) accessible by the one or more processors 762 (e.g., via a memory controller). The one or more processors 762 may interact with the memory 764 to obtain, for example, computer-readable instructions stored in the memory 764. Additionally or alternatively, computer-readable instructions may be stored on one or more removable media (e.g., a compact disc, a digital versatile disc, removable flash memory, etc.) that may be coupled to the data source server 760 to provide access to the computer-readable instructions stored thereon. In particular, the computer-readable instructions stored on the memory 764 may include instructions for transmitting information from the data source database 750 to any other component in the system 700 via the network 104.

The vehicle 115A may also send data to the update effectiveness computing device 702 (e.g., to be used in calculating the effectiveness score, etc.). For example, the vehicle 115A may send: data indicating when the update has been received, data indicating when the update has been implemented, vehicle crash information, etc.

The update effectiveness computing device 702 may also receive data from the vehicle accident record database 136, which may hold any suitable data. For example, the vehicle accident record database 136 may hold accident record information (e.g., a number of accidents, a frequency of accidents, a severity of accidents associated with the vehicles having the vehicle feature, etc.).

The update effectiveness computing device 702 may also receive data from the VDR 740. The VDR 740 may store any kind of data. For example, the VDR 740 may store data comprising the vehicle feature. In some embodiments, the vehicle feature may be stored in an original equipment manufacturer (OEM)-agnostic terminology, as described elsewhere herein.

Additionally or alternatively, the VDR 740 may store standardized build sheets. Broadly speaking, standardized build sheets may be vehicle build sheets including standardized information. For example, as discussed elsewhere herein, different vehicle manufacturers may use different terms to describe substantially the same vehicle feature. The standardized build sheets may advantageously account for this by using a common ontology (e.g., generated by the ontology generator 126) in the standardized build sheets.

The standardized build sheets may include fields, such as the example fields 850 of FIG. 8. For instance, the fields of a standardized build sheet may include: a vehicle identification number (VIN); vehicle make; vehicle model; vehicle model year; vehicle trim; vehicle drivetrain; vehicle body type; vehicle fuel type; vehicle number of engine cylinders; base manufacturer's suggested retail price (MSRP); MSRP; vehicle engine layout; vehicle engine capacity; vehicle engine horsepower (HP); vehicle transmission type; vehicle transmission speeds; vehicle wheelbase; vehicle curb weight; gross vehicle minimum weight; gross vehicle weight maximum; vehicle length; vehicle width; vehicle height; truck bed length; tire wheel diameter; tire aspect ratio; tire width tire construction; presence of adaptive cruise control; presence of adaptive cruise control with stop; presence of backup camera; presence of blind spot warning; presence of blind spot prevention; presence of automatic high beams; presence of adaptive headlights curve; presence of adaptive headlights distance; presence of adaptive driving beams; presence of forward collision warning; presence of forward collision warning with automatic emergency breaking (AEB); and/or presence of forward collision warning with AEB and pedestrian detection. In some embodiments, a VIN in a VIN field is used as the identifier of the standardized build sheet.

Additionally or alternatively, the fields of the standardized vehicle build sheet may also include accident information of the vehicle. The accident information may include, for instance, a speed at which a vehicle was traveling at when an accident occurred; a portion of a vehicle impacted by the accident; and/or weather conditions during the accident.

The standardized build sheets may be constructed by any suitable component, such as the VDR computing device 772, the computing device 102, etc. In one example, a standardized build sheet may be constructed by filling the fields of the standardized build sheet based upon selections of data from the VBI database 135, and/or the data source database 750. To this end, the component constructing the standardized build sheet may make a determination of a best source for the information for each of the fields based upon reliability and detail of each of the respective data sources.

Advantageously, to help make better selections of data to fill the fields of the standardized build sheet, a common ontology (as described elsewhere herein) may be created between any or all of terms of the VBI database 135, and/or the data source database 750. For instance, different terms describing the same part in each of the respective data sources may be mapped together.

Machine Learning Examples

In some embodiments, the update effectiveness calculator 726 uses a machine leaning model to wholly or partially calculate the effectiveness score of the update. The machine learning model may be trained by the machine learning training application 724.

In general, training the machine learning model may include establishing a network architecture, or topology, and adding layers that may be associated with one or more activation functions (e.g., a rectified linear unit, softmax, etc.), loss functions and/or optimization functions. Multiple different types of artificial neural networks may be employed, including without limitation, recurrent neural networks, convolutional neural networks, and deep learning neural networks. Data sets used to train the artificial neural network(s) may be divided into training, validation, and testing subsets; these subsets may be encoded in an N-dimensional tensor, array, matrix, or other suitable data structures. Training may be performed by iteratively training the network using labeled training samples. Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned," values.

In one embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or separately trained and operated in conjunction.

Figure 9:
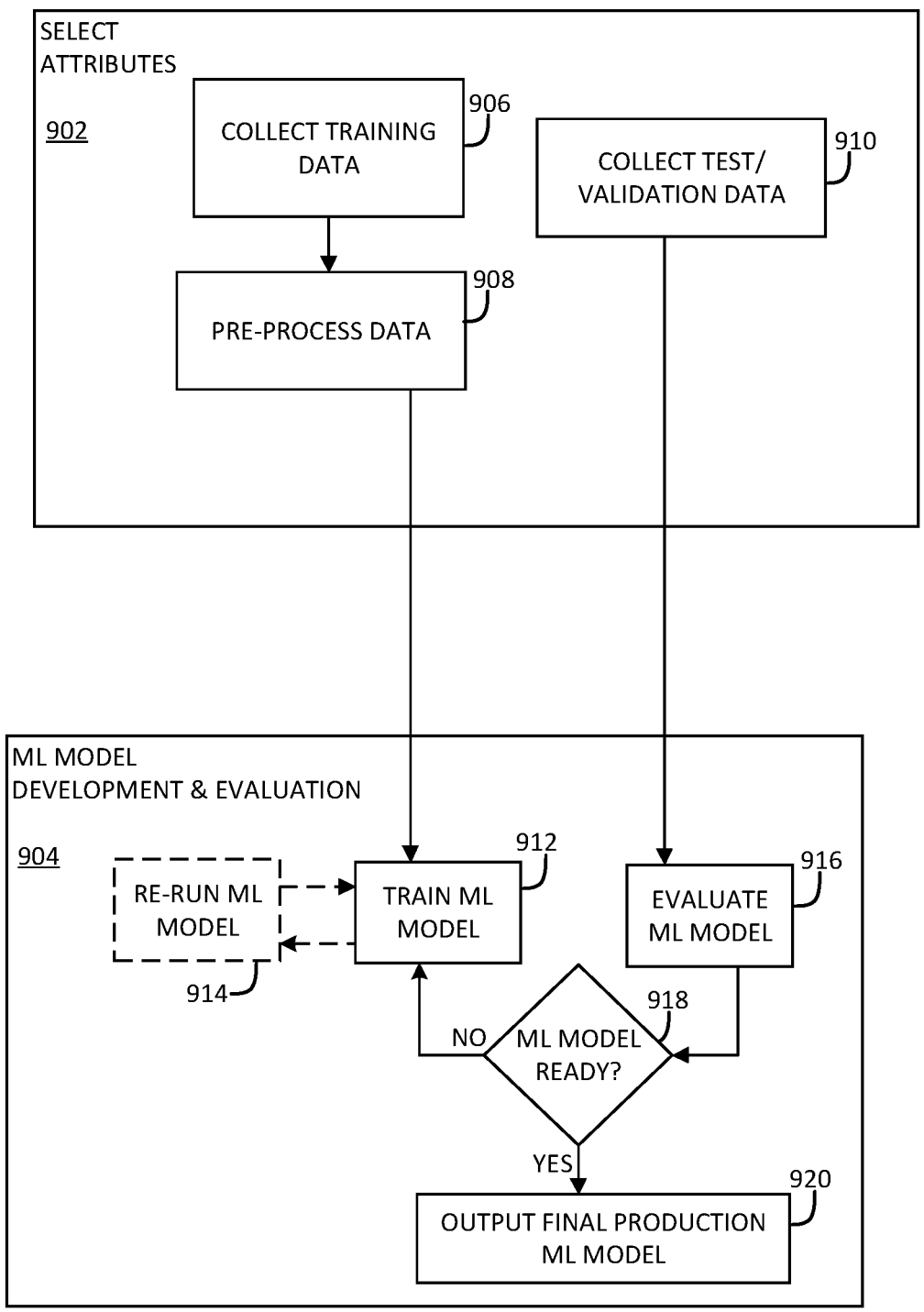
FIG. 9 illustrates an example of training a machine learning algorithm, in accordance with some embodiments.

FIG. 9 is a block diagram of an exemplary machine learning modeling method 900 for training and evaluating a machine learning model (e.g., a machine learning algorithm), in accordance with various embodiments. It should be understood that the principles of FIG. 9 may apply to any machine learning algorithm discussed herein. As will be discussed further below, in some embodiments, the machine learning model may be used to calculate the effectiveness score of an update; in other embodiments, the machine learning model may be used to calculate the effectiveness score associated with a smart safety feature; in other embodiments, the machine learning model may be used to create ontology models; in other embodiments, the machine learning model may be used to select data to fill a standardized build sheet, such as that as in the example of FIG. 8. The discussion of FIG. 9 below will be, for illustrative purposes, with reference to calculating the effectiveness score of an update.

In some embodiments, the model "learns" an algorithm capable of calculating the effectiveness score. For instance, the machine learning algorithm may be trained to calculate the effectiveness score of an update based upon a (i) first dataset with data from before an update was sent to or implemented in the vehicles having the vehicle feature, and (ii) a second dataset with data from after the update was sent to or implemented in the vehicles having the vehicle feature.

At a high level, the machine learning modeling method 900 may include a block 902 for preparation of model input data, and a block 904 for model training and evaluation. The model training, storage, and implementation may be performed at the update effectiveness computing device 702 (e.g., by the machine learning training application 724) or any other suitable component. In some embodiments, the training, storage, and implementation steps of the machine learning model may be performed at different computing devices or servers. For example, the machine learning model may be trained at any of the update effectiveness computing device 702, the computing device 102, VDR computing device 772, and/or the data source server 760; the machine learning model may then be stored and implemented at any of these components.

Depending on implementation, one or more machine learning models may be trained at the same time. The different trained models may be further operated separately or in conjunction. Specific attributes in the training data sets may determine for which particular model each data set will be used. The determination may be made on attributes such as specific features of the information from the update effectiveness computing device 702, the computing device 102, VDR computing device 772, and/or the data source server 760. Training multiple models may provide an advantage of expediting calculations and further increasing specificity of prediction for each model's particular instance space.

Depending on implementation, the machine learning model may be trained based upon supervised learning, unsupervised learning, or semi-supervised learning. Such learning paradigms may include reinforcement learning. Supervised learning is a learning process for learning the underlying function or algorithm that maps an input to an output based on example input-output combinations. A "teaching process" compares predictions by the model to known answers (labeled data) and makes corrections in the model. The trained algorithm is then able to make predictions of outputs based on the inputs. In such embodiments, the data (e.g., a first dataset with data from before the update was sent to or implemented in the vehicles having the vehicle feature, and a second dataset with data from after the update was sent to or implemented in the vehicles having the vehicle feature, etc.) may be labeled according to the corresponding output (e.g., a known effectiveness score of an update, etc.).

Unsupervised learning is a learning process for generalizing the underlying structure or distribution in unlabeled data. In embodiments utilizing unsupervised learning, the system may rely on unlabeled datasets from before and/or after an update was sent to or implemented in the vehicles having the feature, etc. During unsupervised learning, natural structures are identified and exploited for relating instances to each other. Semi-supervised learning can use a mixture of supervised and unsupervised techniques. This learning process discovers and learns the structure in the input variables, where typically some of the input data is labeled, and most is unlabeled. The training operations discussed herein may rely on any one or more of supervised, unsupervised, or semi-supervised learning.

Block 902 may include any one or more blocks or sub-blocks 906-910, which may be implemented in any suitable order. At block 906, the machine learning training application 724, executed by processor 720 according to instructions on program memory 722, may obtain training data from the VDR 740, the computing device 102, the vehicle 115A, and/or the data source server 760. For implementations training a machine learning algorithm to calculate the effectiveness score of an update, the training data may include a first dataset with data from before the update was sent to or implemented in the vehicles having the vehicle feature, and a second dataset with data from after the update was sent to or implemented in the vehicles having the vehicle feature, etc.

Initially, at block 908, relevant data may be selected from among available data (e.g., historical data). Training data may be assessed and cleaned, including handling missing data and handling outliers. For example, missing records, zero values (e.g., values that were not recorded), incomplete data sets (e.g., for scenarios when data collection was not completed), outliers, and inconclusive data may be removed. In order to select high predictive value features, special feature engineering techniques may be used to derive useful features from the datasets. For example, data may be visualized for the underlying relationships to determine which feature engineering steps should be assessed for performance improvement.

This step may include manually entering user input, for example via user interface 723, which may include defining possible predictive variables for the machine learning model. Manual user input may also include manually including or excluding variables selection after running special feature engineering techniques. Manual user input may be guided by an interest to evaluate, for example, an interaction of two or more predictor variables (e.g., vehicle accident record information, such as a number of accidents, a frequency of accidents, a severity of accidents associated with the vehicles having the vehicle feature, etc.).

Furthermore, at block 908, various measures may be taken to ensure a robust set of training data (e.g., providing standardized, heterogeneous data, removing outliers, imputing missing values, and so on). In certain embodiments, special feature engineering techniques may be used to extract or derive the best representations of the predictor variables to increase the effectiveness of the model. To avoid overfitting, in some embodiments feature reduction may be performed. In some embodiments, feature engineering techniques may include an analysis to remove uncorrelated features or variables. Variables may be evaluated in isolation to eliminate low predictive value variables, for example, by applying a cut-off value.

At block 910, the machine learning training application 724 may receive test data for testing the model or validation data for validating the model (e.g., from the VDR 740, the computing device 102, the vehicle 115A, and/or the data source server 760). Some or all of the training, test, or validation data sets may be labeled with pre-determined answers (e.g., based upon a known or determined effectiveness score of an update, etc.).

Block 904 illustrates an exemplary machine learning (ML) model development and evaluation phase. Block 904 may include any one or more blocks or sub-blocks 912-920, which may be implemented in any suitable order. In one example, at block 912, the training module trains the machine learning model by running one or more pre-processed training data sets described above. At block 914, the training module re-runs several iterations of the machine learning model. At block 916, the training module evaluates the machine learning model, at block 918 the training module determines whether or not the machine learning model is ready for deployment before either proceeding to block 920 to output final production model or returning to block 912 to further develop, test, or validate the model.

Regarding block 912, developing the model typically involves training the model using training data. At a high level, the machine learning model may be utilized to discover relationships between various observable features (e.g., between predictor features and target features) in a training dataset, which may then be applied to an input dataset to predict unknown values for one or more of these features given the known values for the remaining features. At block 904, these relationships are discovered by feeding the model pre-processed training data including instances each having one or more predictor feature values and one or more target feature values. The model then "learns" an algorithm capable of calculating or predicting the target feature values (e.g., to calculate the effectiveness variable, etc.) given the predictor feature values.

At block 912, the machine learning model may be trained (e.g., by the update effectiveness computing device 702, the computing device 102, the VDR computing device 772, or combinations thereof, etc.) to thereby generate the machine learning model. Techniques for training/generating the machine learning model may include gradient boosting, neural networks, deep learning, linear regression, polynomial regression, logistic regression, support vector machines, decision trees, random forests, nearest neighbors, or any other suitable machine learning technique. In some examples, the update effectiveness computing device 702, the computing device 102, and/or the VDR computing device 772 implements gradient boosting machine learning (for example, using the open source extreme gradient boosting (XGBoost) algorithm) with a secondary application of the model for close cases and/or error correction. In certain embodiments, training the machine learning model may include training more than one model according to the selected method(s) on the data pre-processed at block 908 implementing different method(s) and/or using different sub-sets of the training data, or according to other criteria.

Training the machine learning model may include re-running the model (at optional block 914) to improve the accuracy of prediction values. For example, re-running the model may improve model training when implementing gradient boosting machine learning. In another implementation, re-running the model may be necessary to assess the differences caused by an evaluation procedure. For instance, available data sets in the vehicle accident records database 136, the computing device 102, the data source server 760, the VDR 740, and/or any other data source may be split into training and testing data sets by randomly assigning sub-sets of data to be used to train the model or evaluate the model to meet the predefined train or test set size, or an evaluation procedure may use a k-fold cross validation. Both of these evaluation procedures are stochastic, and, as such, each evaluation of a deterministic ML model, even when running the same algorithm, provides a different estimate of error or accuracy. The performance of these different model runs may be compared using one or more accuracy metrics, for example, as a distribution with mean expected error or accuracy and a standard deviation. In certain implementations, the models may be evaluated using metrics such as root mean square error (RMSE), to measure the accuracy of prediction values.

Regarding block 916, evaluating the model typically involves testing the model using testing data or validating the model using validation data. Testing/validation data typically includes both predictor feature values and target feature values (e.g., including order demand patterns for which corresponding delivery patterns are known), enabling comparison of target feature values predicted by the model to the actual target feature values, enabling one to evaluate the performance of the model. This testing/validation process is valuable because the model, when implemented, will generate target feature values for future input data that may not be easily checked or validated. Thus, it is advantageous to check one or more accuracy metrics of the model on data for which the target answer is already known (e.g., testing data or validation data), and use this assessment as a proxy for predictive accuracy on future data. Example accuracy metrics include key performance indicators, comparisons between historical trends and predictions of results, cross-validation with subject matter experts, comparisons between predicted results and actual results, etc.

Regarding block 918, any suitable set of metrics may be used to determine whether or not to proceed to block 920 to output the final production model. Generally speaking, the decision to proceed to block 920 or to return to block 912 will depend on one or more accuracy metrics generated during evaluation (block 916). After the sub-blocks 912-918 of block 904 have been completed, block 920 may be implemented. At block 920, the machine learning model may be output.

Exemplary Methods for Calculating Update Effectiveness Score

Figure 10:
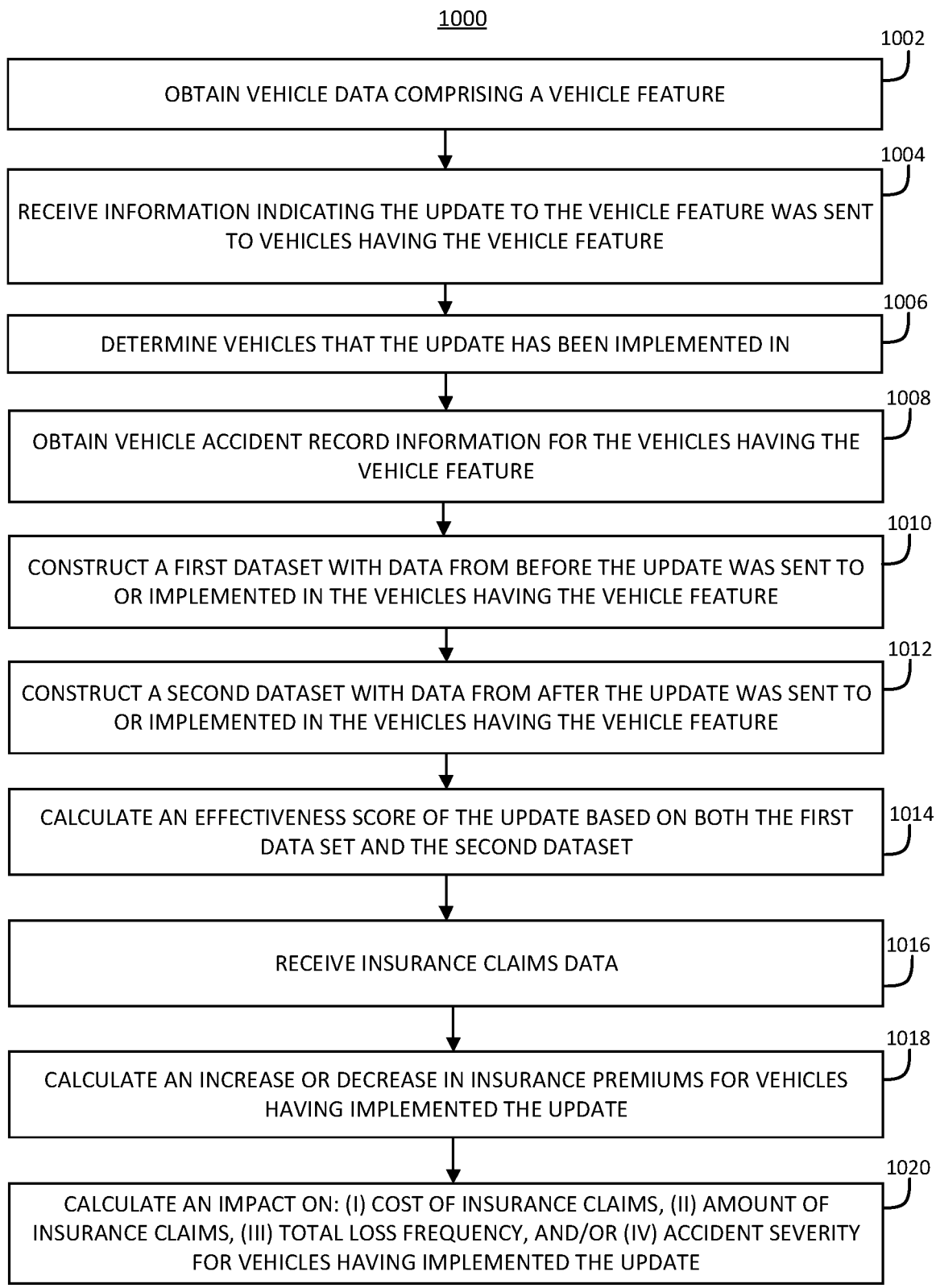
FIG. 10 illustrates an exemplary computer-implemented method for calculating an effectiveness of an update to a vehicle feature.

Broadly speaking, the update effectiveness computing device 702 may calculate an effectiveness score for an update to a vehicle feature. To this end, FIG. 10 shows an example implementation 1000 of calculating the effectiveness score. It may be noted that while the example implementation is described with reference to the update effectiveness computing device 702 performing many of the blocks, any suitable component (e.g., the computing device 102, the VDR computing device 772, etc.) may perform any block. Furthermore, it should be understood that the implementation 1000 is an example, and other implementations may include additional, fewer, and/or alternate blocks/actions, such as those discussed elsewhere herein.

The example implementation 1000 begins at block 1002 when the update effectiveness computing device 702 obtains vehicle data comprising a vehicle feature (e.g., from the VDR 740). In some examples, the vehicle feature is a safety feature, such as a forward collision warning system. However, the vehicle feature does not need to be a vehicle safety feature.

Some examples of vehicle features include: adaptive cruise control; adaptive cruise control with stop; backup camera; blind spot warning; blind spot prevention; automatic high beams; adaptive headlights curve; adaptive headlights distance; adaptive driving beams; forward collision warning; lane change assist; infotainment system; global positioning satellite (GPS) (e.g., a GPS device with a screen built into the vehicle); etc.

In some implementations, the feature comprises a subscription to a service, such as a subscription to a hands-free driving feature.

Furthermore, the vehicle feature may be advantageously received from where it was stored in an original equipment manufacturer (OEM)-agnostic terminology, as described elsewhere herein. For example, the VDR 740 may store features in OEM-agnostic terminology.

At block 1004, the update effectiveness computing device 702 may receive information indicating the update to the vehicle feature was sent to vehicles (e.g., vehicle 115A) having the vehicle feature. The information may be received directly from the vehicles (e.g., vehicle 115A, an application of a mobile device of a user of the vehicle 115A, etc.), and/or any other source(s), such as the computing device 102, the data source database 750, the VDR 740, etc. In some implementations, an owner of the vehicle first opts in (e.g., consents) to have information about the vehicle shared with other sources.

At block 1006, the update effectiveness computing device 702 may determine vehicles that the update has been implemented in. For example, simply because an update was sent to a vehicle does not necessarily mean that the vehicle actually implemented the feature.

In this regard, sometimes, it may not be readily apparent if an update has been implemented in a vehicle. For example, a company may push a software update to vehicle 115A, but the user of the vehicle may have to then manually activate the update for the update to be implemented.

In another example, a user may have to activate the feature that the update applies to. For instance, if the update is for a lane change assist feature, the update may only be implemented when the user is driving with the lane change assist feature activated. In a further example, the feature may be a subscription to a service; for instance, a user may purchase a subscription for a period of time (e.g., a year) to a service (e.g., a hands-free driving service), but then allow the subscription to lapse at the end of a year. Therefore, there may be a start time and an end time to implementation of the feature that is subscription dependent. Thus, in some scenarios, it is useful to determine when a feature is actually being implemented in a vehicle.

The determination (e.g., at block 1006) may be made by any suitable technique. For example, the vehicles (e.g., vehicle 115A, etc.) may send information indicating that they have implemented the feature. Additionally or alternatively, the vehicle manufacturer (e.g., the data source database 750 may be the data source database of a manufacturer, and the data source server 760 may be the server of a manufacturer) may send information indicating that the feature has been implemented. Additionally or alternatively, applications of mobile devices of users of the vehicles may send indications indicating that the feature has been implemented.

At block 1008, the update effectiveness computing device 702 may obtain vehicle accident record information for the vehicles having the vehicle feature (e.g., from the vehicle record accident database 136). The vehicle accident record information may include one or more of a number of accidents, a frequency of accidents, or a severity of accidents associated with the vehicles having the vehicle feature. The severity of the accidents may indicate, among other things, whether the vehicle was a total loss. Additionally or alternatively, the vehicle record information may include information of a weather condition occurring during accidents, such as a rain condition, a wind condition, and/or a sunlight condition. In some embodiments, the accident record information includes insurance claims data.

At block 1010, the update effectiveness computing device 702 may construct a first dataset with data from before the update was sent to or implemented in the vehicles having the vehicle feature. The first dataset may be constructed by any suitable technique. In one example, the first dataset is all or part of the accident data (e.g., a number of accidents, a frequency of accidents, or a severity of accidents associated with the vehicles having the vehicle feature) received (e.g., at block 1008) for vehicles having the feature during the time period before the update was sent to or implemented in the vehicles. In another example, the first dataset may include only data that meets a particular condition. For instance, the first dataset may be constructed to be only data of accidents occurring during a weather condition (e.g., when it was raining). In another instance, the first dataset may be constructed to be only accidents occurring during a particular time of day (e.g., in the morning, at night, etc.).

At block 1012, the update effectiveness computing device 702 may construct a second dataset with data from after the update was sent to or implemented in the vehicles having the vehicle feature. The second dataset may be constructed by any suitable technique. In one example, the second dataset is all or part of the accident data (e.g., a number of accidents, a frequency of accidents, or a severity of accidents associated with the vehicles having the vehicle feature) received (e.g., at block 1008) for vehicles having the feature during the time period after the update was sent to or implemented in the vehicles. In another example, the second dataset may include only data that meets a particular condition. For instance, the second dataset may be constructed to be only data of accidents occurring during a weather condition (e.g., when it was raining). In another instance, the second dataset may be constructed to be only accidents occurring during a particular time of day (e.g., in the morning, at night, etc.).

At block 1014, the update effectiveness computing device 702 may calculate the effectiveness score of the update based upon both the first data set and the second dataset. The calculation may be made by any suitable technique. For example, the first and second datasets may be input into a trained machine learning algorithm (e.g., as in the example of FIG. 9). Examples of machine learning algorithms include neural networks, convolutional neural networks, random forests, etc. However, in some embodiments, the effectiveness score is calculated without using a machine learning algorithm. For instance, the effectiveness score may be calculated by using lookup tables, mathematical equations, etc. In some examples, calculating the effectiveness score comprises comparing the first dataset to the second dataset.

In some embodiments, the calculation of the effectiveness score is further based on the information of the weather condition occurring during the accidents. For example, vehicle accidents occurring during rain may impact the effectiveness score less than accidents not occurring during rain; furthermore, accidents occurring during sever weather (e.g., flood, tornado, etc.) may have even less of an impact on the effectiveness score than accidents occurring during rain.

In some embodiments, the calculated effectiveness score may be useful for vehicle manufacturers in determining future adjustments to make to features on their vehicles. For example, the vehicle feature may be a forward collision warning system, and the update may be make a sensitivity metric of the forward collision warning system more or less sensitive during a particular condition (e.g., rain, bright sunlight, darkness, etc.). In this example, the calculated effectiveness score may be useful for the vehicle manufacturer in determining future adjustments to make to the sensitivity metric.

In another example, the vehicle feature is an infotainment system, and the update may be a change to a button placement on a screen of the infotainment system. In this example, calculating an effectiveness score may help a vehicle manufacturer know if changing a button placement (or if a specific button placement on the screen) causes an increased number of accidents.

In yet another example, the feature may be a lane departure warning feature that nudges the steering wheel when the car begins to drift into another lane. In this example, the update may be a force by which the steering wheel is nudged by. Here, the effectiveness score may be useful to help the vehicle manufacturer determine an optimal amount of force to nudge the steering wheel by.

At block 1016, the update effectiveness computing device 702 may receive insurance claims data. The insurance claims data may be received from any suitable source, such as the computer system of an insurance company, a third party aggregator, etc. In some examples, the data source database is the database of an insurance company, and the data source server 760 is the data source server of the insurance company. In some examples, the data source database may be the database of a third party aggregator, and the data source server 760 is the data source server of the third party aggregator.

The insurance claims data may include any kind of data. For example, the insurance claims data may include: accident information associated with the insurance claims, cost to repair the vehicle, whether the vehicle was a total loss, medical treatment information of a driver, cost of a medical treatment for a driver, driving conditions during an accident (e.g., weather conditions), year/make/model of a vehicle, feature information of the vehicle, age of the driver, gender of the driver, location of the accident, any of the information of a standardized build sheet (e.g., information from the example of FIG. 8), etc.

At block 1018, the update effectiveness computing device 702 may calculate an increase or decrease in insurance premiums for vehicles having implemented the update. The increase or decrease may be calculated based upon any suitable criteria, such as the insurance claims data, the effectiveness score, etc. In some examples, the increase or decrease may be calculated based upon the age and/or gender of the driver (e.g., from the insurance claims data), and the effectiveness score.

At block 1020, the update effectiveness computing device 702 may calculate (i) cost of insurance claims, (ii) amount of insurance claims, (iii) total loss frequency (e.g., that the vehicle is a total loss as a result of the accident), and/or (iv) accident severity for vehicles having implemented the update. In some examples, the calculation may be made based upon (i) the insurance claims data, and/or (ii) the effectiveness score of the update. Such calculations may be useful for insurance companies or vehicle manufactures. For example, a calculation of an impact on an update for a vehicle feature on accident severity may be useful to insurance companies or vehicle manufactures.

Exemplary Calculation of an Effectiveness Score of an Update

In one aspect, a computer-implemented method for use in determining effectiveness of an update to a vehicle feature may be provided. The method may be implemented via one or more local or remote processors, servers, transceivers, sensors, memory units, and/or other electrical or electronic components. The method may comprise: (1) obtaining, by one or more processors, vehicle data from a vehicle data repository, the vehicle data comprising a vehicle feature, and the vehicle feature being stored in an original equipment manufacturer (OEM)-agnostic terminology; (2) receiving, by the one or more processors, information indicating an update to the vehicle feature was sent to vehicles having the vehicle feature; (3) obtaining, by the one or more processors, vehicle accident record information for the vehicles having the vehicle feature, wherein the vehicle accident record information includes one or more of a number of accidents, a frequency of accidents, or a severity of accidents associated with the vehicles having the vehicle feature; (4) constructing, by the one or more processors, a first dataset with data from before the update was sent to or implemented in the vehicles having the vehicle feature; (5) constructing, by the one or more processors, a second dataset with data from after the update was sent to or implemented in the vehicles having the vehicle feature; and/or (6) calculating, by the one or more processors, an effectiveness score of the update based upon both the first data set and the second dataset. The method may include additional, fewer, or alternate actions, including those discussed elsewhere herein.

In some embodiments, the vehicle feature may be a vehicle safety feature. In certain embodiments: the vehicle feature may be a forward collision warning system; and/or the update to the vehicle feature makes a sensitivity metric of the forward collision warning system more sensitive.

In some embodiments: the vehicle accident record information further may include information of a weather condition occurring during accidents; and/or the calculation of the effectiveness score may be further based on the information of the weather condition occurring during the accidents. In some embodiments, the weather condition may include a rain condition, a wind condition, and/or a sunlight condition.

In some embodiments, the method further may include determining, by the one or more processors, vehicles that the update has been implemented in. The first dataset may be constructed from the data from the vehicles having the vehicle feature from before the update was implemented; and/or the second dataset may be constructed from the data from the vehicles having the vehicle feature from after the update was implemented.

In some embodiments, the vehicle accident record information further may include subscription information including information of a start time of a subscription to the vehicle feature, and the method may include determining, by the one or more processors, that the vehicle feature is implemented at the start time of the subscription to the vehicle feature. The first dataset may be constructed from the data from the vehicles having the vehicle feature from before the update was implemented. The second dataset may be constructed from the data from the vehicles having the vehicle feature from after the update was implemented.

In some embodiments, the subscription information may include information of a subscription to a hands-free driving feature. In certain embodiments, the update to the vehicle feature may include changes to button placement on a vehicle infotainment system.

In some embodiments, the method may include receiving, by the one or more processors, insurance claims data; and/or calculating, by the one or more processors, an increase or decrease in insurance premiums for vehicles having implemented the update, wherein the calculation may be based upon: (i) the insurance claims data, and/or (ii) the effectiveness score of the update.

In some embodiments, the method further may include receiving, by the one or more processors, insurance claims data; and/or calculating, by the one or more processors, an impact on: (i) cost of insurance claims, or (ii) amount of insurance claims for vehicles having implemented the update; and the calculation may be based upon: (i) the insurance claims data, and/or (ii) the effectiveness score of the update.

In some embodiments, the information indicating the update to the vehicle may be received from a vehicle manufacturer, a third party aggregator, an application of a computing device of vehicle operators, and/or the vehicle data repository. In some embodiments, the calculating the effectiveness score may include comparing the first dataset to the second dataset.

In some embodiments, calculating the effectiveness score may include inputting the first dataset and the second dataset into a machine learning algorithm.

In another aspect, computer system for use in determining effectiveness of an update to a vehicle feature may be provided. The computer system may include one or more local or remote processors, servers, transceivers, sensors, memory units, and/or other electrical or electronic components. In certain embodiments, the computer system may include one or more processors configured to: (1) obtain vehicle data from a vehicle data repository, the vehicle data comprising a vehicle feature, and the vehicle feature being stored in an original equipment manufacturer (OEM)-agnostic terminology; (2) receive information indicating an update to the vehicle feature was sent to vehicles having the vehicle feature; (3) obtain vehicle accident record information for the vehicles having the vehicle feature, wherein the vehicle accident record information includes one or more of a number of accidents, a frequency of accidents, or a severity of accidents associated with the vehicles having the vehicle feature; (4) construct a first dataset with data from before the update was sent to or implemented in the vehicles having the vehicle feature; (5) construct a second dataset with data from after the update was sent to or implemented in the vehicles having the vehicle feature; and/or (6) calculate an effectiveness score of the update based upon both the first data set and the second dataset. The computer system may include additional, less, or alternate functionality, including that discussed elsewhere herein.

In some embodiments, the vehicle feature may be a vehicle safety feature. In certain embodiments, the one or more processors are further configured to determine vehicles that the update has been implemented in. The first dataset may be constructed from: (i) the data from the vehicles having the vehicle feature from before the update was implemented, and/or (ii) the accident record information. The second dataset may be constructed from: (i) the data from the vehicles having the vehicle feature from after the update was implemented, and/or (ii) the accident record information.

In another aspect, a computer system for use in determining effectiveness of an update to a vehicle feature may be provided. The computer system may include one or more local or remote processors, servers, transceivers, sensors, memory units, and/or other electrical or electronic components. In some embodiments, the computer system may comprise: one or more processors; and a non-transitory program memory communicatively coupled to the one or more processors and storing executable instructions that, when executed by the one or more processors, cause the computer system to: (1) obtain vehicle data from a vehicle data repository, the vehicle data comprising a vehicle feature, and the vehicle feature being stored in an original equipment manufacturer (OEM)-agnostic terminology; (2) receive information indicating an update to the vehicle feature was sent to vehicles having the vehicle feature; (3) obtain vehicle accident record information for the vehicles having the vehicle feature, wherein the vehicle accident record information includes one or more of a number of accidents, a frequency of accidents, or a severity of accidents associated with the vehicles having the vehicle feature; (4) construct a first dataset with data from before the update was sent to or implemented in the vehicles having the vehicle feature; (5) construct a second dataset with data from after the update was sent to or implemented in the vehicles having the vehicle feature; and/or (6) calculate an effectiveness score of the update based upon both the first data set and the second dataset. The computer system may include additional, less, or alternate functionality, including that discussed elsewhere herein.

In some embodiments, the vehicle feature may be a vehicle safety feature. The instructions, when executed by the one or more processors, may cause the computer system to: determine vehicles that the update has been implemented in. The first dataset may be constructed from: (i) the data from the vehicles having the vehicle feature from before the update was implemented, and/or (ii) the accident record information. The second dataset may be constructed from: (i) the data from the vehicles having the vehicle feature from after the update was implemented, and/or (ii) the accident record information.

Exemplary Distributed Ledger System for Vehicle Updates

A distributed ledger (also referred to herein as a blockchain) provides a way of achieving a distributed consensus on the validity or invalidity of information stored on the distributed ledger. In other words, the distributed ledger provides a decentralized trust to participants and observers. As opposed to relying on a central authority, a distributed ledger may be a decentralized database in which a transactional record of changes to the distributed ledger is maintained and validated by each node of a peer-to-peer network. The distributed ledger may be comprised of groupings of transactions organized together into a "block," and ordered sequentially (thus the term "blockchain"). Nodes may join and leave the distributed ledger network over time and may obtain blocks that were propagated while the node was gone from peer nodes. Nodes may maintain addresses of other nodes and exchange addresses of known nodes with one another to facilitate the propagation of new information across the network in a decentralized, peer-to-peer manner.

The nodes that share the distributed ledger form what is sometimes referred to herein as the distributed ledger network. The nodes in the distributed ledger network validate changes to the distributed ledger (e.g., when a new transaction and/or block is created) according to a set of consensus rules. The consensus rules depend on the information being tracked by the blockchain and may include rules regarding the chain itself. For example, a consensus rule may include that the originator of a change supply a proof-of-identity such that only approved entities may originate changes to the chain. A consensus rule may require that blocks and transactions adhere to format requirement and supply certain meta information regarding the change (e.g., blocks must be below a size limit, transactions must include a number of fields, etc.). Consensus rules may include a mechanism to determine the order in which new blocks are added to the chain (e.g., through a proof-of-work system, proof-of-stake, etc.).

Additions to the blockchain that satisfy the consensus rules are propagated from nodes that have validated the addition to other nodes that the validating node is aware of. If all the nodes that receive a change to the blockchain validate the new block, then the distributed ledger reflects the new change as stored on all nodes, and it may be said that distributed consensus has been reached with respect to the new block and the information contained therein. Any change that does not satisfy the consensus rule is disregarded by validating nodes that receive the change and is not propagated to other nodes. Accordingly, unlike a traditional system which uses a central authority, a single party cannot unilaterally alter the distributed ledger unless the single party can do so in a way that satisfies the consensus rules. The inability to modify past transactions leads to blockchains being generally described as trusted, secure, and immutable.

The validation activities of nodes applying consensus rules on a blockchain network may take various forms. In one implementation, the blockchain may be viewed as a shared spreadsheet that tracks data such as the ownership of assets. In another implementation, the validating nodes execute code contained in "smart contracts" and distributed consensus is expressed as the network nodes agreeing on the output of the executed code.

Distributed ledgers may be deployed in a public, decentralized, and permissionless manner meaning that any party may view the distributed ledger, submit new information to be added to the ledger, or join the network as a validating node. Other blockchains are private that keep chain data private among a group of entities authorized to participate in the blockchain network. Yet other blockchains are permissioned which may be a hybrid of a public and a private blockchain. In some scenarios, private blockchains are maintained by a single entity, whereas permissioned blockchains include multiple authorized entities to make changes to the blockchain.

Figure 11:
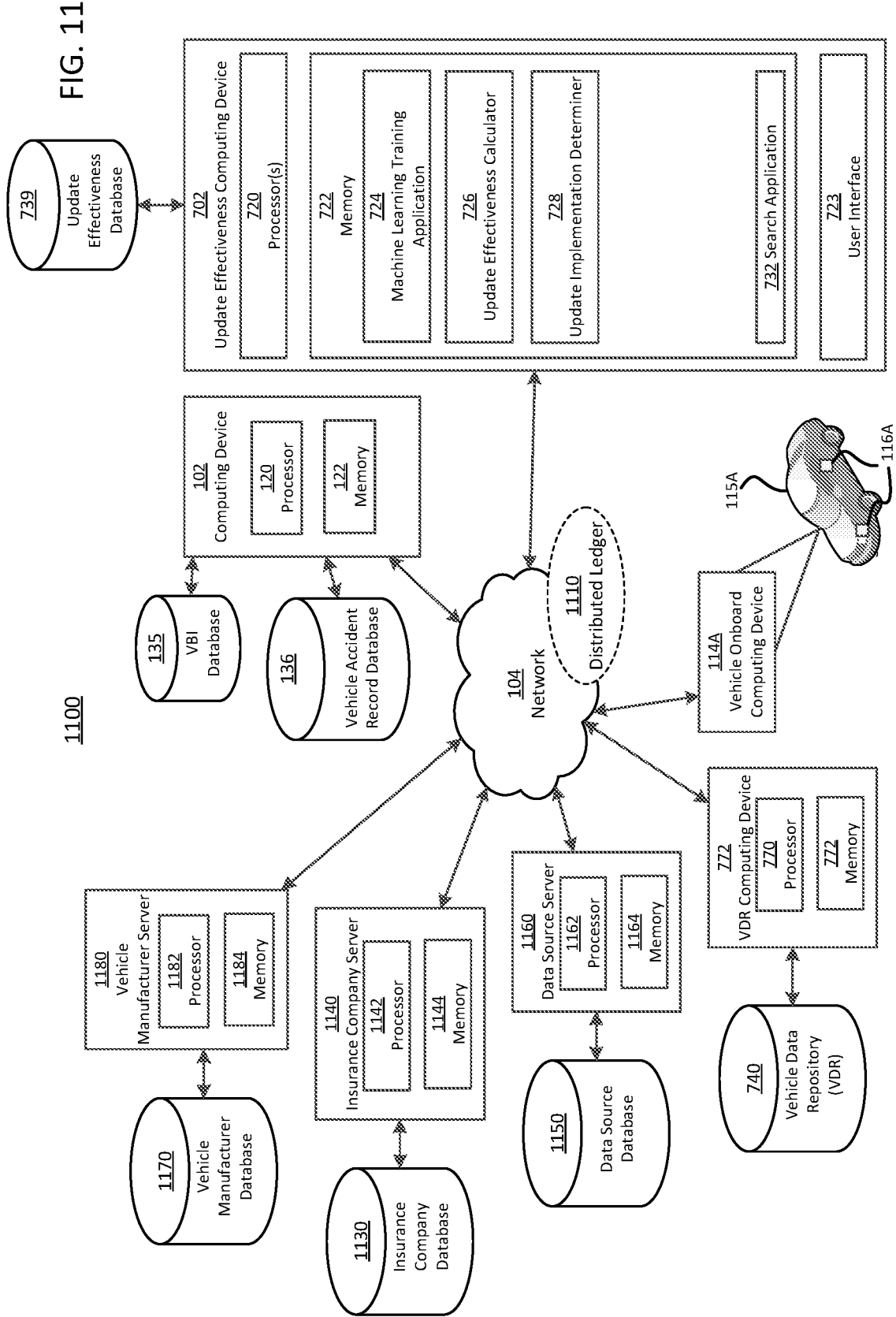
FIG. 11 illustrates an exemplary distributed ledger system for tracking effectiveness of an update to a vehicle feature.

FIG. 11 illustrates an exemplary distributed ledger system 1100 for tracking effectiveness of an update to a vehicle feature. Broadly speaking, the components in the system 1100 may be nodes of the distributed ledger 1110. Furthermore, many of the components of the system 1100 may calculate information to be placed on the distributed ledger 1110. In addition, although the example of FIG. 11 illustrates only one of each of many of the components, such as the computing device 102, the VDR computing device 772, the vehicle 115A, and the data source database 1150, insurance company server 1140, vehicle manufacture server 1180, etc., any number of each of the components may be included in a system (e.g., multiple data source databases, multiple vehicles, etc.).

The system 1100 may include an update effectiveness computing device 702, which may include one or more processors 720 such as one or more microprocessors, controllers, and/or any other suitable type of processor. The update effectiveness computing device 702 may further include a memory 722 (e.g., volatile memory, non-volatile memory) accessible by the one or more processors 720, (e.g., via a memory controller). Additionally, the update effectiveness computing device 702 may include a user interface 723.

The one or more processors 720 may interact with the memory 722 to obtain, for example, computer-readable instructions stored in the memory 722. Additionally or alternatively, computer-readable instructions may be stored on one or more removable media (e.g., a compact disc, a digital versatile disc, removable flash memory, etc.) that may be coupled to the update effectiveness computing device 702 to provide access to the computer-readable instructions stored thereon. In particular, the computer-readable instructions stored on the memory 722 may include instructions for executing various applications, such as, e.g., a machine learning model training application 724, update effectiveness calculator 726, and/or update implementation determiner 728.

In general, the update effectiveness calculator 726 may calculate an effectiveness score for an update to a vehicle. For example, the update effectiveness calculator 726 may construct a first dataset with data from before the update was sent to or implemented in vehicles having the vehicle feature, and construct a second dataset with data from after the update was sent to or implemented in the vehicles having the vehicle feature. The update effectiveness calculator 726 may then calculate an effectiveness score of the update based on both the first data set and the second dataset. In some implementations, the effectiveness score may be calculated using a machine learning algorithm (e.g., trained and/or executed by the machine learning training application 724, as will be described elsewhere herein).

Once calculated, the effectiveness score may be stored in the memory 722. Additionally or alternatively, the effectiveness score may be stored in the update effectiveness database 739, which may store any suitable data. For example, the update effectiveness database 739 may store effectiveness scores, vehicle build sheets, standardized vehicle build sheets, any datasets (e.g., the first and second datasets from before and after an update was implemented), vehicle feature information (e.g., dates/times vehicle features were implemented, specifics of vehicle features, subscription information, infotainment system button placement information, etc.), historical weather condition information, insurance claim information, accident information (e.g., a number of accidents, a frequency of accidents, or a severity of accidents), etc.

In some scenarios, it may not be readily apparent if an update has been implemented in a vehicle. For example, a company may push a software update to vehicle 115A, but the user of the vehicle may have to then manually activate the update for the update to be implemented. In another example, a user may have to activate the feature that the update applies to. For instance, if the update is for a lane change assist feature, the update may only be implemented when the user is driving with the lane change assist feature activated. In this regard, the update implementation determiner 728 may determine when an update has been implemented.

In addition, the update effectiveness computing device 702 may also include a search application 732, which may provide a search feature to be displayed to a user via, e.g., via a web interface or via the user interface 723. In one example, the search application 732 may receive user input indicating a vehicle feature to be searched, and may search the update effectiveness database 739 for effectiveness score (s) and/or any other data of the vehicle feature. In another example, the search application 732 may receive user input indicating a vehicle identification number (VIN) to be searched, and may search the vehicle build information to locate a matching vehicle and its associated standardized build sheet (e.g., constructed by the standardized build vehicle data repository (VDR) computing device 772, as will be described further below) to thereby display the associated information.

To calculate the effectiveness score, the update effectiveness computing device 702 may use data from any suitable source. For example, the update effectiveness computing device 702 may receive data from any of the data source database 1150, the vehicle 115A, the VDR computing device 772, the computing device 102, the vehicle manufacturer database 1170, the insurance company database 1130, etc.

The data source database 1150 may hold any suitable data. Examples of the data held by the data source database 1150 include data from before an update was sent to or implemented in the vehicles having the vehicle feature, data from after the update was sent to or implemented in the vehicles having the vehicle feature, vehicle information (e.g., year/make/model of the vehicle, safety feature information, accident record information, ownership information, etc.). Examples of the data source database 1150 include a governmental database, a third party aggregator, a National Highway Traffic Safety Administration (NHTSA) information database, a Highway Loss Data Institute (HLDI) information database, an Insurance Institute for Highway Safety (IIHS) database, etc.

Furthermore, the data source database 1150 may be connected to a data source server 1160, which may include one or more processors 1162, such as one or more microprocessors, controllers, and/or any other suitable type of processor. The data source server 1160 may further include a memory 1164 (e.g., volatile memory, non-volatile memory) accessible by the one or more processors 1162 (e.g., via a memory controller). The one or more processors 1162 may interact with the memory 1164 to obtain, for example, computer-readable instructions stored in the memory 1164. Additionally or alternatively, computer-readable instructions may be stored on one or more removable media (e.g., a compact disc, a digital versatile disc, removable flash memory, etc.) that may be coupled to the data source server 1160 to provide access to the computer-readable instructions stored thereon. In particular, the computer-readable instructions stored on the memory 1164 may include instructions for transmitting information from the data source database 1150 to any other component in the system 1100 via the network 104.

The vehicle 115A may also send data to the update effectiveness computing device 702 (e.g., to be used in calculating the effectiveness score, etc.). For example, the vehicle 115A may send: data indicating when the update has been received, data indicating when the update has been implemented, vehicle crash information, etc.

The update effectiveness computing device 702 may also receive data from the vehicle accident record database 136, which may hold any suitable data. For example, the vehicle accident record database 136 may hold accident record information (e.g., a number of accidents, a frequency of accidents, a severity of accidents associated with the vehicles having the vehicle feature, etc.).

The update effectiveness computing device 702 may also receive data from the VDR 740. The VDR 740 may store any kind of data. For example, the VDR 740 may store data comprising the vehicle feature. In some embodiments, the vehicle feature is stored in an original equipment manufacturer (OEM)-agnostic terminology, as described elsewhere herein. Additionally or alternatively, the VDR 740 may store standardized build sheets, as also described elsewhere herein.

The update effectiveness computing device 702 may also receive data from the insurance company database 1130. The insurance company database 1130 may hold any kind of data, such as any data held by an insurance company. For instance, the insurance company database 1130 may hold insurance claims data including, for example, accident information associated with the insurance claims, cost to repair the vehicle, whether the vehicle was a total loss, medical treatment information of a driver, cost of a medical treatment for a driver, driving conditions during an accident (e.g., weather conditions), year/make/model of a vehicle, feature information of the vehicle, age of the driver, gender of the driver, location of the accident, any of the information of a standardized build sheet (e.g., information from the example of FIG. 8), etc.

The insurance company database 1130 may be connected to an insurance company server 1140, which may include one or more processors 1142, such as one or more microprocessors, controllers, and/or any other suitable type of processor. The insurance company server 1140 may further include a memory 1144 (e.g., volatile memory, non-volatile memory) accessible by the one or more processors 1142 (e.g., via a memory controller). The one or more processors 1142 may interact with the memory 1144 to obtain, for example, computer-readable instructions stored in the memory 1144. Additionally or alternatively, computer-readable instructions may be stored on one or more removable media (e.g., a compact disc, a digital versatile disc, removable flash memory, etc.) that may be coupled to the insurance company server 1140 to provide access to the computer-readable instructions stored thereon. In particular, the computer-readable instructions stored on the memory 1144 may include instructions for transmitting information from the insurance company database 1130 to any other component in the system 1100 via the network 104.

The update effectiveness computing device 702 may also receive data from the vehicle manufacturer database 1170. The vehicle manufacturer database 1170 may hold any kind of data, such as any data held by a vehicle manufacturer. For instance, vehicle manufacturer database 1170 may hold vehicle data including, for example, year/make/model of a vehicle, feature information of the vehicle, age of the owner, gender of the owner, any of the information of a standardized build sheet (e.g., information from the example of FIG. 8), etc.

The vehicle manufacturer database 1170 may be connected to a vehicle manufacturer server 1180, which may include one or more processors 1182, such as one or more microprocessors, controllers, and/or any other suitable type of processor. The vehicle manufacturer server 1180 may further include a memory 1184 (e.g., volatile memory, non-volatile memory) accessible by the one or more processors 1182 (e.g., via a memory controller). The one or more processors 1182 may interact with the memory 1184 to obtain, for example, computer-readable instructions stored in the memory 1184. Additionally or alternatively, computer-readable instructions may be stored on one or more removable media (e.g., a compact disc, a digital versatile disc, removable flash memory, etc.) that may be coupled to the vehicle manufacturer server 1180 to provide access to the computer-readable instructions stored thereon. In particular, the computer-readable instructions stored on the memory 1184 may include instructions for transmitting information from the vehicle manufacturer database 1170 to any other component in the system 1100 via the network 104.

As mentioned above, any of the components in the system 1100 (e.g., the computing device 102, the update effectiveness computing device 702, the vehicle 115A, the VDR computing device 772, the data source server 1160, the insurance company server 1140, the vehicle manufacturer server 1180) may be nodes of the distributed ledger 1110.

Further as mentioned above, a distributed ledger, such as a blockchain, is a way of achieving a distributed consensus on the validity or invalidity of information. As opposed to using a central authority, a blockchain is a distributed database, or ledger, in which a transactional record is maintained at each node of a peer-to-peer network. The distributed ledger may be comprised of groupings of transactions bundled together into a "block." When a change to the distributed ledger is made (e.g., when a new transaction and/or block is created), each node must form a consensus as to how the change is integrated into the distributed ledger. Upon consensus, the agreed upon change is pushed out to each node so that each node maintains an identical copy of the updated distributed ledger. Any change that does not achieve a consensus is ignored. Accordingly, unlike a traditional system which uses a central authority, a single party cannot unilaterally alter the distributed ledger. Advantageously, this inability to modify past transactions lead to blockchains being generally described as trusted, secure, and immutable.

Some blockchains may be deployed in an open, decentralized, and permissionless manner meaning that any party may view information, submit new information, or join the blockchain as a node responsible for confirming information. This open, decentralized, and permissionless approach to a blockchain has limitations. As an example, these blockchains may not be good candidates for interactions that require information to be kept private, such as information related to a vehicle lifecycle process, or for interactions that require all participants to be vetted prior to their participation.

In any event, to create a new block, each transaction within a block may be assigned a hash value (i.e., an output of a cryptographic hash function, such as SHA-256 or MD5). These hash values may then be combined together utilizing data storage and cryptographic techniques (e.g., a Merkle Tree) to generate a hash value representative of the entire new block, and consequently the transactions stored in the block. This hash value may then be combined with the hash value of the previous block to form a hash value included in the header of the new block, thereby cryptographically linking the new block to the blockchain. To this end, the precise value utilized in the header of the new block may be dependent on the hash value for each transaction in the new block, as well as the hash value for each transaction in every prior block.

According to certain aspects disclosed herein, information stored in blockchains can be trusted, because the hash value generated for the new block and a nonce value (an arbitrary number used once) are used as inputs into a cryptographic puzzle. The cryptographic puzzle may have a difficulty set by the nodes connected to the blockchain network, or the difficulty may be set by administrators of the blockchain network. In one example of the cryptographic puzzle, a solving node uses the hash value generated for the new block and repeatedly changes the value of the nonce until a solution for the puzzle is found. For example, finding the solution to the cryptographic puzzle may involve finding the nonce value that meets certain criteria (e.g., the nonce value begins with five zeros).

When a solution to the cryptographic puzzle is found, the solving node publishes the solution and the other nodes then verify that the solution is valid. Since the solution depends on the particular hash values for each transaction within the blockchain, if the solving node attempted to modify any transaction stored in the blockchain, the solution would not be verified by the other nodes. More specifically, if a single node attempts to modify a prior transaction within the blockchain, a cascade of different hash values may be generated for each tier of the cryptographic combination technique. This results in the header for one or more blocks being different than the corresponding header(s) in every other node that did not make the exact same modification.

Figure 12:
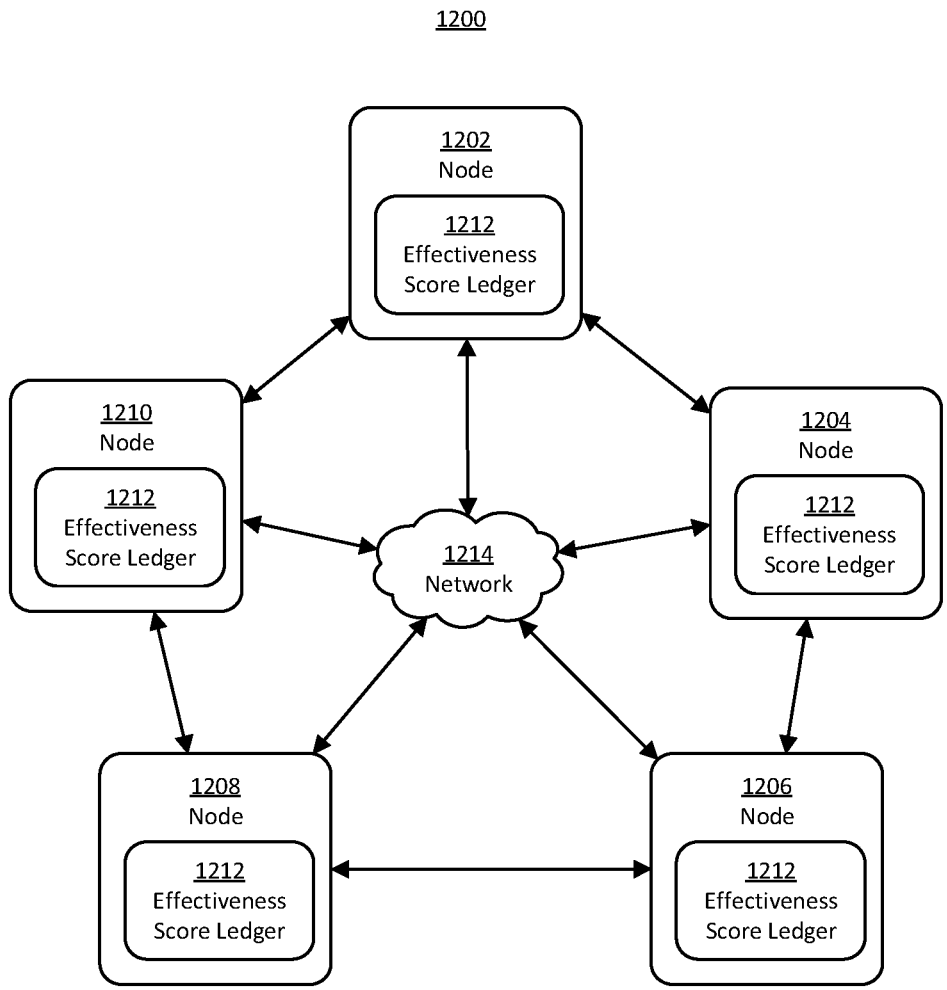
FIG. 12 illustrates another exemplary distributed ledger system tracking effectiveness of an update to a vehicle feature.

FIG. 12 depicts an exemplary distributed ledger system 1200 for tracking effectiveness of an update to a vehicle feature. The system 1200 includes a shared effectiveness score ledger 1212 (which, in some embodiments, is the distributed ledger 1110 of the example of FIG. 11) and plurality of nodes 1202, 1204, 1206, 1208, and 1210. Each node maintains a copy of the effectiveness score ledger 1212. As changes are made to the effectiveness score ledger 1212, each node receiving the change via network 1214 updates its respective copy of the effectiveness score ledger 1212. A consensus mechanism may be used by the nodes 1202-1210 in the distributed ledger system 1200 to decide whether it is appropriate to make received changes to the effectiveness score ledger 1212.

Each node in the system therefore has its own copy of the effectiveness score ledger 1212, which is identical to every other copy of the effectiveness score ledger 1212 stored by the other nodes. The distributed ledger system 1200 is more robust than a central authority database system because of the distributed ledger's decentralized nature. As such, there is no single point of failure on the distributed ledger system 1200 as there would be in a centralized system.

Figure 13:
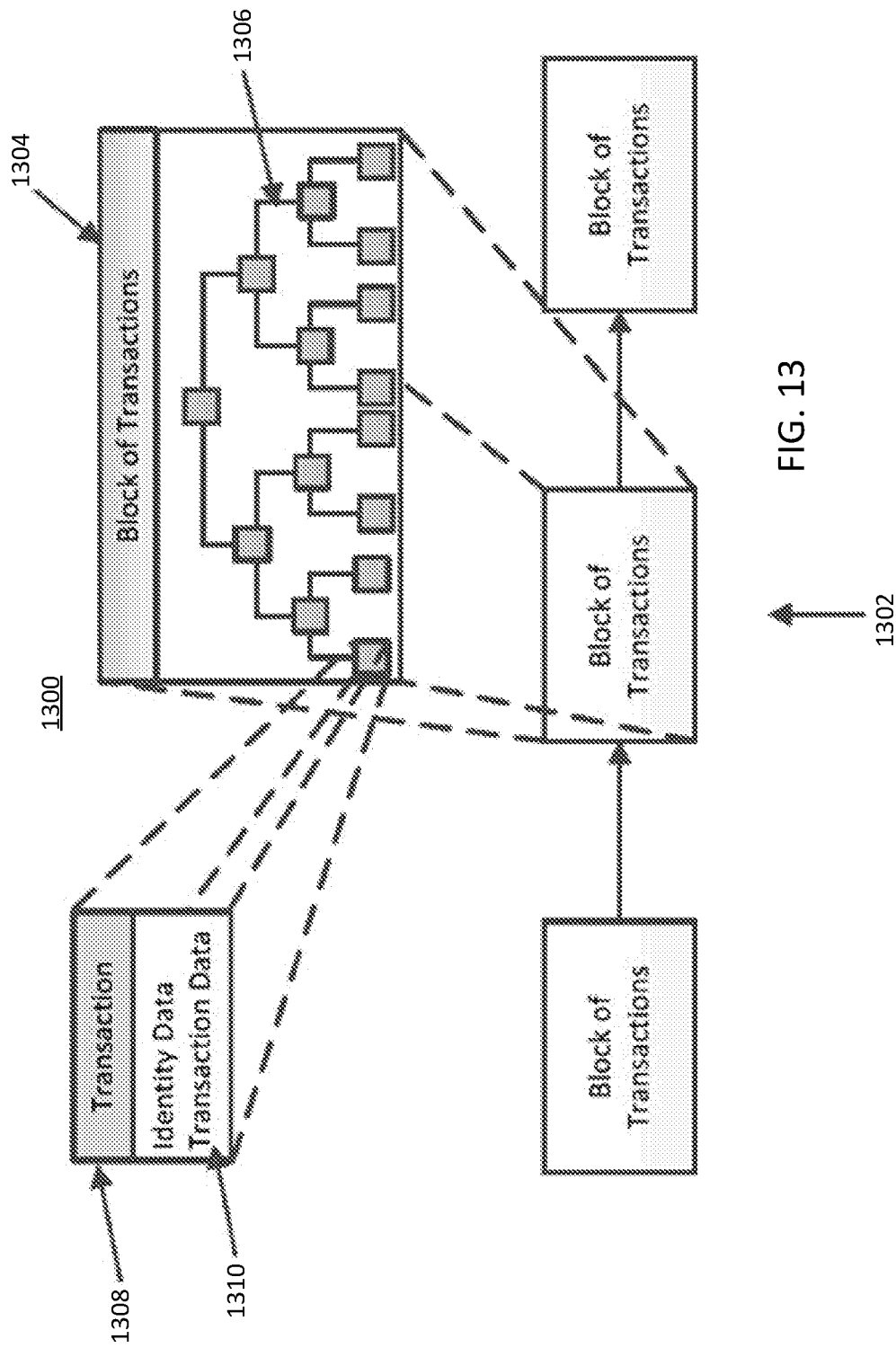
FIG. 13 illustrates another exemplary distributed ledger system tracking effectiveness of an update to a vehicle feature.

FIG. 13 depicts an exemplary distributed ledger system 1300 in accordance with one aspect of the present disclosure. FIG. 13 includes a distributed ledger 1302, a block of transactions 1304, a Merkle Tree 1306, and a transaction 1308. The Merkle Tree may cryptographically link transactions together. In some embodiments, the Merkle tree is a tree in which every node (e.g., "leaf") is labelled with the cryptographic hash of a data block, and every node that is not a leaf (e.g., a "branch," inner node, or inode) is labelled with the cryptographic hash of the labels of its child nodes. However, some embodiments do not use a Merkle tree; and any suitable method of organizing transactions in a block may be used. In some embodiments, the distributed ledger system 1300 includes a plurality of blocks connected together to form the distributed ledger 1302 (e.g., a chain of blocks of transactions).

Each block of transactions 1304 may include at least one transaction 1308 (e.g., adding an effectiveness score). In other embodiments, each block of transactions 1304 has a size limit that necessarily limits the number of transactions that the block may store. Each block of transactions 1304 includes a reference to a previous block of transactions that was added to the distributed ledger 1302 prior to the block of transactions 1304 being added to the distributed ledger 1302. As such, and as described above, each block of transactions 1304 is linked to every other block in the distributed ledger 1302.

In some embodiments, the block of transactions 1304 may organize the transactions it has received into a Merkle Tree 1306 to facilitate access to the stored transactions. The transactions may be hashed using a cryptographic hash algorithm (e.g., SHA-256 or MD5), and the hash of each transaction is stored in the tree. As the tree is constructed the hash of each adjacent node at the same level is hashed together to create a new node that exists at a higher level in the tree. Therefore, the root of the tree, or the node at the top of the tree, is dependent upon the hash of each transaction stored below in the tree. Each transaction 1308 may include a set of data 1310. The set of data 1310 may include identifying data for the transaction, and transaction data, such as data identifying the nature of the transaction, data that is to be stored (e.g., the effectiveness score, etc.), etc.

Exemplary Distributed Ledger Methods for Vehicle Updates

Figure 14:
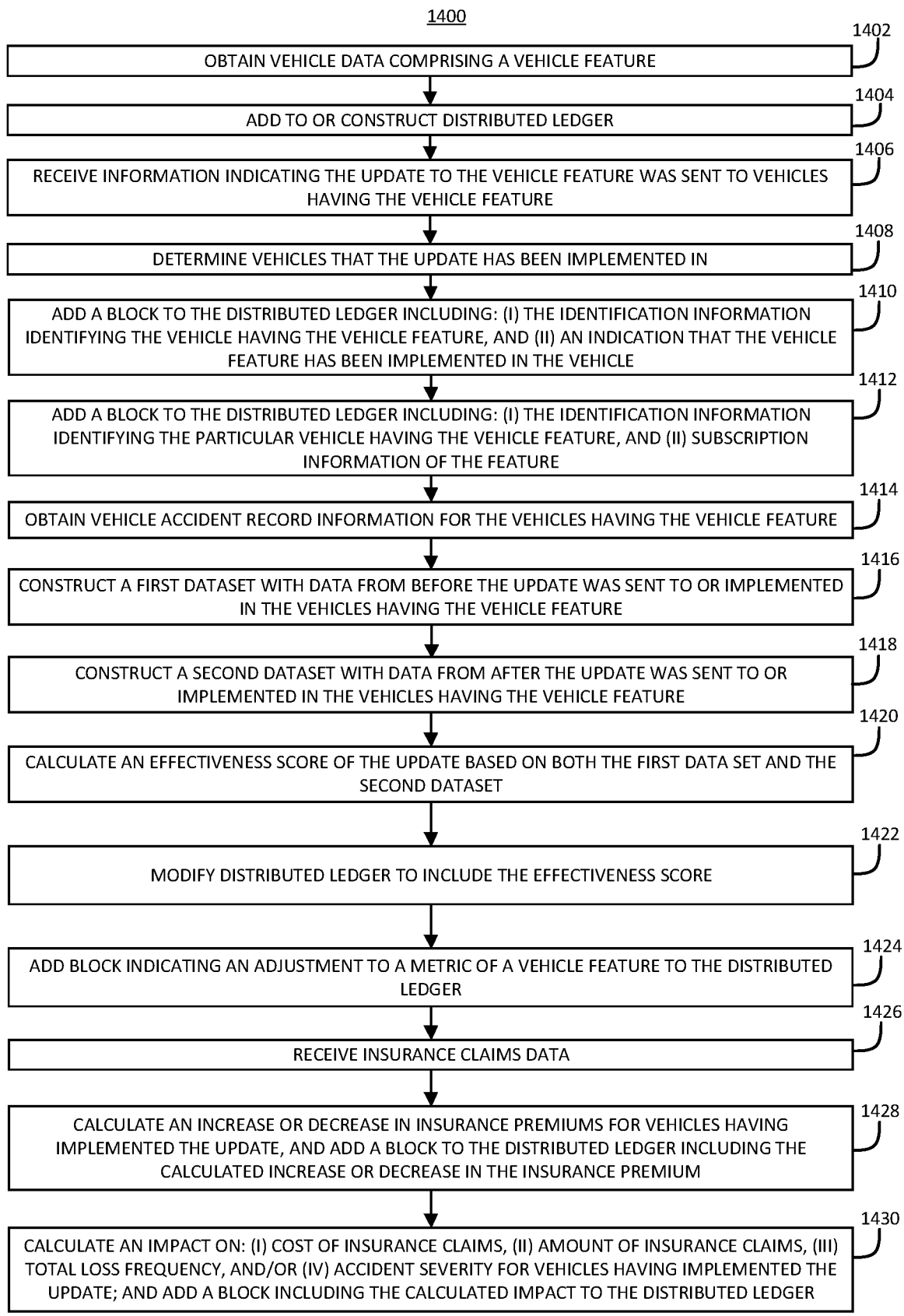
FIG. 14 illustrates an exemplary computer-implemented method for tracking an effectiveness of an update to a vehicle feature.

Broadly speaking, the distributed ledger 1110 may be used to track updates to vehicle features. To this end, FIG. 14 shows an exemplary implementation 1400 of tracking vehicle updates. It may be noted that while the example implementation is described with reference to the update effectiveness computing device 702 performing many of the blocks, any suitable component (e.g., the computing device 102, the VDR computing device 772, the insurance company server 1140, etc.) may perform any block. Furthermore, it should be understood that the implementation 1400 is an example, and other implementations may include additional, fewer, and/or alternate blocks/actions, such as those discussed elsewhere herein.

The example implementation 1400 begins at block 1402 when the update effectiveness computing device 702 obtains vehicle data comprising a vehicle feature (e.g., from the VDR 740). In some examples, the vehicle feature may be a safety feature, such as a forward collision warning system. However, the vehicle feature does not need to be a vehicle safety feature.

At block 1404, a distributed ledger (e.g., distributed ledger 1110, effectiveness score ledger 1212, distributed ledger 1302, etc.) may be added to or constructed. In one example, a block including the vehicle feature, and the identification information identifying vehicles having the vehicle feature is added to the distributed ledger.

At block 1406, the update effectiveness computing device 702 may receive information indicating the update to the vehicle feature was sent to vehicles (e.g., vehicle 115A) having the vehicle feature. The information may be received directly from the vehicles (e.g., vehicle 115A, an application of a mobile device of a user of the vehicle 115A, etc.), and/or any other source(s), such as the computing device 102, the data source database 1150, the VDR 740, the insurance company database 1130, the vehicle manufacturer database 1170, etc. In some implementations, an owner of the vehicle first opts in (e.g., consents) to have information about the vehicle shared with other sources.

At block 1408, the update effectiveness computing device 702 (or any other entity) may determine vehicles that the update has been implemented in. For example, simply because an update was sent to a vehicle does not necessarily mean that the vehicle actually implemented the feature. In this regard, sometimes, it may not be readily apparent if an update has been implemented in a vehicle. For example, a company may push a software update to vehicle 115A, but the user of the vehicle may have to then manually activate the update for the update to be implemented.

In another example, a user may have to activate the feature that the update applies to. For instance, if the update is for a lane change assist feature, the update may only be implemented when the user is driving with the lane change assist feature activated. In another example, the feature may be a subscription to a service; for instance, a user may purchase a subscription for a period of time (e.g., a year) to a service (e.g., a hands-free driving service), but then allow the subscription to lapse at the end of a year. Therefore, there may be a start time and an end time to implementation of the feature that is subscription dependent. Thus, in some scenarios, it is useful to determine when a feature is actually being implemented in a vehicle.

The determination (e.g., at block 1408) may be made by any suitable technique. For example, the vehicles (e.g., vehicle 115A, etc.) may send information indicating that they have implemented the feature. Additionally or alternatively, the vehicle manufacturer server 1180 may send information indicating that the feature has been implemented. Additionally or alternatively, applications of mobile devices of users of the vehicles may send indications indicating that the feature has been implemented.

The determination of vehicles that have implemented the features may be useful to various entities, in particular the update effectiveness computing device 702 (e.g., for calculating the effectiveness score). In this regard, at block 1410, the distributed ledger may be modified to include the effectiveness score. For example, a block including (i) the identification information identifying the vehicle having the vehicle feature, and/or (ii) an indication that the vehicle feature has been implemented in the vehicle may be added to the distributed ledger 1110.

Advantageously, this creates a convenient way to share the determination between different entities (e.g., the different entities of FIG. 11). For example, in some embodiments, any entity (e.g., the vehicle manufacturer server 1180, the insurance company server 1140, the data source server 1160, update effectiveness computing device 702, etc.) may determine vehicles that the update has been implemented in, and then add this information to the distributed ledger 1110 so that it is easily accessed by the update effectiveness computing device 702 for calculating the effectiveness score. Another advantage is the robustness created by placing the determination on the distributed ledger 1110; for example, all nodes will have a copy of the determination, so if one node fails, information of the determination will not be lost.

Subscription information may also be useful to various entities, in particular the update effectiveness computing device 702 (e.g., for calculating the effectiveness score). In this regard, at block 1412, the distributed ledger may be modified to include the effectiveness score. For example, a block including (i) the identification information identifying the vehicle having the vehicle feature, and/or (ii) subscription information may be added to the distributed ledger 1110.

The subscription information may include any kind of information. For example, the subscription information may include: a feature that the subscription is for; a start time of the subscription for the vehicle; a stop time of the subscription for the vehicle; purchase price of the subscription; information of updates to the feature; etc.

Advantageously, adding such a block creates a convenient way to share the subscription information between different entities (e.g., the different entities of FIG. 11). For example, in some embodiments, any entity (e.g., the vehicle manufacturer server 1180, the insurance company server 1140, the data source server 1160, update effectiveness computing device 702, etc.) may add the subscription information to the distributed ledger 1110 so that it is easily accessed by the update effectiveness computing device 702 for calculating the effectiveness score. Another advantage is the robustness created by placing the subscription information on the distributed ledger 1110; for example, all nodes will have a copy of the subscription information, so if one node fails, the subscription information will not be lost.

At block 1414, the update effectiveness computing device 702 may obtain vehicle accident record information for the vehicles having the vehicle feature (e.g., from the vehicle record accident database 136). The vehicle accident record information may include one or more of a number of accidents, a frequency of accidents, or a severity of accidents associated with the vehicles having the vehicle feature. The severity of the accidents may indicate, among other things, whether the vehicle was a total loss. Additionally or alternatively, the vehicle record information may include information of a weather condition occurring during accidents, such as a rain condition, a wind condition, and/or a sunlight condition. In some embodiments, the accident record information includes insurance claims data.

At block 1416, the update effectiveness computing device 702 may construct a first dataset with data from before the update was sent to or implemented in the vehicles having the vehicle feature. The first dataset may be constructed by any suitable technique. In one example, the first dataset is all or part of the accident data (e.g., a number of accidents, a frequency of accidents, or a severity of accidents associated with the vehicles having the vehicle feature) received (e.g., at block 1414) for vehicles having the feature during the time period before the update was sent to or implemented in the vehicles. In another example, the first dataset may include only data that meets a particular condition. For instance, the first dataset may be constructed to be only data of accidents occurring during a weather condition (e.g., when it was raining). In another instance, the first dataset may be constructed to be only accidents occurring during a particular time of day (e.g., in the morning, at night, etc.).

At block 1418, the update effectiveness computing device 702 may construct a second dataset with data from after the update was sent to or implemented in the vehicles having the vehicle feature. The second dataset may be constructed by any suitable technique. In one example, the second dataset is all or part of the accident data (e.g., a number of accidents, a frequency of accidents, or a severity of accidents associated with the vehicles having the vehicle feature) received (e.g., at block 1414) for vehicles having the feature during the time period after the update was sent to or implemented in the vehicles.

In another example, the second dataset may include only data that meets a particular condition. For instance, the second dataset may be constructed to be only data of accidents occurring during a weather condition (e.g., when it was raining). In another instance, the second dataset may be constructed to be only accidents occurring during a particular time of day (e.g., in the morning, at night, etc.).

At block 1420, the update effectiveness computing device 702 may calculate the effectiveness score of the update based upon both the first data set and the second dataset. The calculation may be made by any suitable technique. For example, the first and second datasets may be input into a trained machine learning algorithm (e.g., as in the example of FIG. 9). Examples of machine learning algorithms include neural networks, convolutional neural networks, random forests, etc. However, in some embodiments, the effectiveness score is calculated without using a machine learning algorithm. For instance, the effectiveness score may be calculated by using lookup tables, mathematical equations, etc. In some examples, calculating the effectiveness score comprises comparing the first dataset to the second dataset.

In some embodiments, the calculation of the effectiveness score may be further based on the information of the weather condition occurring during the accidents. For example, vehicle accidents occurring during rain may impact the effectiveness score less than accidents not occurring during rain; furthermore, accidents occurring during sever weather (e.g., flood, tornado, etc.) may have even less of an impact on the effectiveness score than accidents occurring during rain.

The effectiveness score may be useful to many different entities (e.g., vehicle manufacturers, insurance companies, etc.). In this regard, at block 1422, the distributed ledger may be modified to include the effectiveness score. For example, a block may be added to the distributed ledger than includes the effectiveness score.

Advantageously, this creates a convenient way to share the effectiveness score between different entities (e.g., the different entities of FIG. 11). For example, in some embodiments, any entity (e.g., the vehicle manufacturer server 1180, the insurance company server 1140, etc.) that might desire to access the effectiveness score calculated by the update effectiveness computing device 702 can simply become a node on the distributed ledger 1110. Another advantage is the immutability created by placing the effectiveness score on the distributed ledger 1110; for example, one vehicle manufacturer may not sabotage (e.g., tarnish the reputation of) another vehicle manufacturer by altering the effectiveness score because of the immutability of the distributed ledger 1110.

In some embodiments, the calculated effectiveness score may be useful for vehicle manufacturers in determining future adjustments to make to features on their vehicles. For example, the vehicle feature may be a forward collision warning system, and the update may be make a sensitivity metric of the forward collision warning system more or less sensitive during a particular condition (e.g., rain, bright sunlight, darkness, etc.). In this example, the calculated effectiveness score may be useful for the vehicle manufacturer in determining future adjustments to make to the sensitivity metric.

In this regard, it is advantageous for vehicle manufacturers and other entities to track adjustments to metrics of vehicle features. To this end, at block 1424, a block may be added to the distributed ledger 1110 that includes an indication of an adjustment to a vehicle feature (e.g., an adjustment to the sensitivity metric, as in the example above).

Advantageously, adding such a block creates a convenient way to share the indication of the adjustment between different entities (e.g., the different entities of FIG. 11). For example, in some embodiments, any entity (e.g., the vehicle manufacturer server 1180, the insurance company server 1140, the data source server 1160, update effectiveness computing device 702, etc.) may add the indication of the adjustment to the distributed ledger 1110 so that it is easily accessed by other entities. Another advantage is the robustness created by placing the indication of the adjustment on the distributed ledger 1110; for example, all nodes will have a copy of the indication of the adjustment, so if one node fails, the indication of the adjustment will not be lost.

At block 1426, the update effectiveness computing device 702 may receive insurance claims data. The insurance claims data may be received from any suitable source, such as the computer system of an insurance company, a third party aggregator, etc. In some examples, the data source database may be the database of an insurance company, and the data source server 760 may be the data source server of the insurance company. In some examples, the data source database may be the database of a third party aggregator, and the data source server 760 may be the data source server of the third party aggregator.

The insurance claims data may include any kind of data. For example, the insurance claims data may include: accident information associated with the insurance claims, cost to repair the vehicle, whether the vehicle was a total loss, medical treatment information of a driver, cost of a medical treatment for a driver, driving conditions during an accident (e.g., weather conditions), year/make/model of a vehicle, feature information of the vehicle, age of the driver, gender of the driver, location of the accident, any of the information of a standardized build sheet (e.g., information from the example of FIG. 8), etc.

At block 1428, the update effectiveness computing device 702 may calculate an increase or decrease in insurance premiums for vehicles having implemented the update. The increase or decrease may be calculated based upon any suitable criteria, such as the insurance claims data, the effectiveness score, etc. In some examples, the increase or decrease is calculated based upon the age and/or gender of the driver (e.g., from the insurance claims data), and the effectiveness score.

A block including the calculated increase or decrease may then be added to the distributed ledger 1110. Advantageously, adding such a block creates a convenient way to share the indication of the calculated increase or decrease between different entities (e.g., the different entities of FIG. 11). For example, in some embodiments, any entity (e.g., the insurance company server 1140, etc.) may add the calculated increase or decrease to the distributed ledger 1110 so that it is easily accessed by other entities. Another advantage is the robustness created by placing the calculated increase or decrease on the distributed ledger 1110; for example, all nodes will have a copy of the calculated increase or decrease, so if one node fails, the calculated increase or decrease will not be lost.

At block 1430, the update effectiveness computing device 702 may calculate (i) cost of insurance claims, (ii) amount of insurance claims, (iii) total loss frequency (e.g., that the vehicle is a total loss as a result of the accident), and/or (iv) accident severity for vehicles having implemented the update. In some examples, the calculation is made based upon (i) the insurance claims data, and/or (ii) the effectiveness score of the update. Such calculations may be useful for insurance companies or vehicle manufactures. For example, a calculation of an impact on an update for a vehicle feature on accident severity may be useful to insurance companies or vehicle manufactures.

A block including the calculated impact may then be added to the distributed ledger 1110. Advantageously, adding such a block creates a convenient way to share the indication of the calculated impact between different entities (e.g., the different entities of FIG. 11). For example, in some embodiments, any entity (e.g., the insurance company server 1140, etc.) may add the calculated impact to the distributed ledger 1110 so that it is easily accessed by other entities. Another advantage is the robustness created by placing the calculated impact on the distributed ledger 1110; for example, all nodes will have a copy of the calculated impact, so if one node fails, the calculated impact will not be lost.

In some embodiments, a further advantage of the techniques described herein is that a complete or partial record for each vehicle is created (e.g., a "living log" of each vehicle is created). For example, the distributed ledger 1110 may include comprehensive information of each vehicle. In this regard, some embodiments use a vehicle identification number (VIN) to identify vehicles on the distributed ledger 1110.

Creating such a complete or partial record is especially advantageous in the situation where the vehicle is bought or sold. For example, a new owner of a vehicle may select subscriptions to different services than a previous owner. In this regard, the vehicle may have substantially different features when purchased by the new owner, and this may be advantageous for various entities to know. Moreover, the complete or partial record may be useful to prospective purchasers of the vehicle when they are making their determination of whether or not to buy the vehicle.

Exemplary Distributed Ledger for Vehicle Updates

In one aspect, a computer implemented method for use in tracking effectiveness of an update to a vehicle feature using a distributed ledger may be provided. The method may be implemented via one or more local or remote processors, servers, transceivers, sensors, memory units, and/or other electrical or electronic components. In certain embodiments, the method may include: (1) obtaining, by one or more processors, vehicle data comprising: (i) a vehicle feature, and (ii) identification information identifying vehicles having the vehicle feature; (2) adding to or constructing, by the one or more processors, a distributed ledger including: (i) the vehicle feature, and (ii) the identification information identifying vehicles having the vehicle feature; (3) receiving, by the one or more processors, information indicating an update to the vehicle feature was sent to vehicles having the vehicle feature; (4) obtaining, by the one or more processors, vehicle accident record information for the vehicles having the vehicle feature, wherein the vehicle accident record information includes one or more of a number of accidents, a frequency of accidents, or a severity of accidents associated with the vehicles having the vehicle feature; (5) constructing, by the one or more processors, a first dataset with data from before the update was sent to or implemented in the vehicles having the vehicle feature; (6) constructing, by the one or more processors, a second dataset with data from after the update was sent to or implemented in the vehicles having the vehicle feature; (7) calculating, by the one or more processors, an effectiveness score of the update based on both the first data set and the second dataset; and/or (8) modifying, by the one or more processors, the distributed ledger to include the effectiveness score. The method may include additional, fewer, or alternate actions, including those discussed elsewhere herein.

In some embodiments, the identification information identifying vehicles having the vehicle feature includes vehicle identification numbers (VINs) of the vehicles having the vehicle feature.

In some embodiments, the modifying the distributed ledger includes adding new blocks to the distributed ledger; and each of the new blocks: (i) correspond to an individual vehicle having the vehicle feature, and (ii) include the effectiveness score.

In some embodiments, the method further may include determining, by the one or more processors, that a vehicle having the vehicle feature has implemented the vehicle feature; and adding, by the one or more processors, to the distributed ledger, a block including: (i) the identification information identifying the vehicle having the vehicle feature, and/or (ii) an indication that the vehicle feature has been implemented in the vehicle.

In some embodiments, the vehicle accident record information further may include subscription information including information of start times of a subscription to the vehicle feature, and the method further may include: determining, by the one or more processors, from the subscription information, that the vehicle feature is implemented at a start time for a particular vehicle having the subscription to the vehicle feature; and adding, by the one or more processors, to the distributed ledger, a block including: (i) the identification information identifying the particular vehicle having the vehicle feature, and/or (ii) the start time for the particular vehicle having the subscription to the vehicle feature.

In some embodiments, the method further may include receiving, by the one or more processors, insurance claims data; calculating, by the one or more processors, an increase or decrease in insurance premiums for vehicles having implemented the update. The calculation may be based upon: (i) the insurance claims data, and (ii) the effectiveness score of the update; and adding, by the one or more processors, to the distributed ledger, blocks including the calculated increase or decrease in insurance premiums.

In some embodiments, the vehicle feature may be a vehicle safety feature, and the method further may include adding, by the one or more processors, to the distributed ledger, blocks indicating an adjustment to a metric of the vehicle safety feature.

In certain embodiments, the calculating the effectiveness score includes inputting the first dataset and the second dataset into a machine learning algorithm.

In another aspect, a computer system for use in tracking effectiveness of an update to a vehicle feature using a distributed ledger may be provided. The computer system may include one or more local or remote processors, servers, transceivers, sensors, memory units, and/or other electrical or electronic components. In certain embodiments, the computer system may include one or more processors configured to: (1) obtain vehicle data comprising: (i) a vehicle feature, and (ii) identification information identifying vehicles having the vehicle feature; (2) add to or construct a distributed ledger including: (i) the vehicle feature, and (ii) the identification information identifying vehicles having the vehicle feature; (3) receive information indicating an update to the vehicle feature was sent to vehicles having the vehicle feature; (4) obtain vehicle accident record information for the vehicles having the vehicle feature, wherein the vehicle accident record information includes one or more of a number of accidents, a frequency of accidents, or a severity of accidents associated with the vehicles having the vehicle feature; (5) construct a first dataset with data from before the update was sent to or implemented in the vehicles having the vehicle feature; (6) construct a second dataset with data from after the update was sent to or implemented in the vehicles having the vehicle feature; (7) calculate an effectiveness score of the update based on both the first data set and the second dataset; and/or (8) modify the distributed ledger to include the effectiveness score. The computer system may include additional, less, or alternate functionality, including that discussed elsewhere herein.

In some embodiments, the identification information identifying vehicles having the vehicle feature includes vehicle identification numbers (VINs) of the vehicles having the vehicle feature.

In some embodiments, the modification of the distributed ledger may include adding new blocks to the distributed ledger; and each of the new blocks: (i) correspond to an individual vehicle having the vehicle feature, and (ii) include the effectiveness score.

In some embodiments, the one or more processors are further configured to determine that a vehicle having the vehicle feature has implemented the vehicle feature; and add, to the distributed ledger, a block including: (i) the identification information identifying the vehicle having the vehicle feature, and/or (ii) an indication that the vehicle feature has been implemented in the vehicle.

In some embodiments, the vehicle accident record information further includes subscription information including information of start times of a subscription to the vehicle feature, and the one or more processors are further configured to: determine, from the subscription information, that the vehicle feature is implemented at a start time for a particular vehicle having the subscription to the vehicle feature; and add, to the distributed ledger, a block including: (i) the identification information identifying the particular vehicle having the vehicle feature, and/or (ii) the start time for the particular vehicle having the subscription to the vehicle feature.

In some embodiments, the one or more processors are further configured to: receive insurance claims data; calculate an increase or decrease in insurance premiums for vehicles having implemented the update, wherein the calculation is based upon: (i) the insurance claims data, and (ii) the effectiveness score of the update; and add, to the distributed ledger, blocks including the calculated increase or decrease in insurance premiums.

In some embodiments, the vehicle feature may be a vehicle safety feature, and the one or more processors are further configured to: add, to the distributed ledger, blocks indicating an adjustment to a metric of the vehicle safety feature.

In some embodiments, the calculation of the effectiveness score includes inputting the first dataset and the second dataset into a machine learning algorithm.

In yet another aspect, a computer system for use in tracking effectiveness of an update to a vehicle feature using a distributed ledger may be provided. The computer system may include one or more local or remote processors, servers, transceivers, sensors, memory units, and/or other electrical or electronic components. In certain embodiments, the computer system may include one or more processors; and a non-transitory program memory communicatively coupled to the one or more processors and storing executable instructions that, when executed by the one or more processors, cause the computer system to: (1) obtain vehicle data comprising: (i) a vehicle feature, and/or (ii) identification information identifying vehicles having the vehicle feature; (2) add to or construct a distributed ledger including: (i) the vehicle feature, and/or (ii) the identification information identifying vehicles having the vehicle feature; (3) receive information indicating an update to the vehicle feature was sent to vehicles having the vehicle feature; (4) obtain vehicle accident record information for the vehicles having the vehicle feature, wherein the vehicle accident record information includes one or more of a number of accidents, a frequency of accidents, or a severity of accidents associated with the vehicles having the vehicle feature; (5) construct a first dataset with data from before the update was sent to or implemented in the vehicles having the vehicle feature; (6) construct a second dataset with data from after the update was sent to or implemented in the vehicles having the vehicle feature; (7) calculate an effectiveness score of the update based on both the first data set and the second dataset; and/or (8) modify the distributed ledger to include the effectiveness score. The computer system may include additional, less, or alternate functionality, including that discussed elsewhere herein.

In some embodiments, the identification information identifying vehicles having the vehicle feature includes vehicle identification numbers (VINs) of the vehicles having the vehicle feature.

In some embodiments, the instructions, when executed by the one or more processors, cause the computer system to perform the modification of the distributed ledger by adding new blocks to the distributed ledger; and each of the new blocks: (i) correspond to an individual vehicle having the vehicle feature, and/or (ii) include the effectiveness score.

In some embodiments, the instructions, when executed by the one or more processors, cause the computer system to: determine that a vehicle having the vehicle feature has implemented the vehicle feature; and add, to the distributed ledger, a block including: (i) the identification information identifying the vehicle having the vehicle feature, and/or (ii) an indication that the vehicle feature has been implemented in the vehicle.

ADDITIONAL CONSIDERATIONS

Although the foregoing text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within an office environment, or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A computer-implemented method for use in determining effectiveness of an update to a vehicle feature, the method comprising:
    obtaining, by one or more processors, vehicle data from a vehicle data repository, the vehicle data comprising a vehicle feature, and the vehicle feature being stored in an original equipment manufacturer (OEM)-agnostic terminology;
    training, by the one or more processors, a machine learning algorithm to calculate effectiveness scores of updates to vehicle features;
    receiving, by the one or more processors, information indicating an update to the vehicle feature was sent to vehicles having the vehicle feature;
    constructing, by the one or more processors, a first dataset with data from before the update was sent to or implemented in the vehicles having the vehicle feature;
    constructing, by the one or more processors, a second dataset with data from after the update was sent to or implemented in the vehicles having the vehicle feature; and
    calculating, by the one or more processors, an effectiveness score of the update based upon both the first dataset and the second dataset, wherein the calculating the effectiveness score comprises inputting the first dataset and the second dataset into the trained machine learning algorithm.

2. The computer-implemented method of claim 1, wherein the vehicle feature is a vehicle safety feature.

3. The computer-implemented method of claim 1, wherein:
    the vehicle feature is a forward collision warning system; and
    the update to the vehicle feature makes a sensitivity metric of the forward collision warning system more sensitive.

4. The computer-implemented method of claim 1, further comprising:
    determining, by the one or more processors, vehicles that the update has been implemented in; and
    wherein the first dataset is constructed from the data from the vehicles having the vehicle feature from before the update was implemented; and wherein the second dataset is constructed from the data from the vehicles having the vehicle feature from after the update was implemented.

5. The computer-implemented method of claim 1, wherein the update to the vehicle feature comprises changes to button placement on a vehicle infotainment system.

6. The computer-implemented method of claim 1, further comprising:
receiving, by the one or more processors, insurance claims data; and
calculating, by the one or more processors, an increase or decrease in insurance premiums for vehicles having implemented the update, wherein the calculation of the increase or decrease is based upon: (i) the insurance claims data, and (ii) the effectiveness score of the update.

7. The computer-implemented method of claim 1, further comprising:
receiving, by the one or more processors, insurance claims data; and
calculating, by the one or more processors, an impact on: (i) cost of insurance claims, or (ii) amount of insurance claims for vehicles having implemented the update; and
wherein the calculation of the impact is based upon: (i) the insurance claims data, and (ii) the effectiveness score of the update.

8. The computer-implemented method of claim 1, wherein the information indicating the update to the vehicle feature is received from a vehicle manufacturer, a third party aggregator, an application of a computing device of vehicle operators, or the vehicle data repository.

9. The computer-implemented method of claim 1, wherein the calculating the effectiveness score comprises comparing the first dataset to the second dataset.

10. A computer system for use in determining effectiveness of an update to a vehicle feature, the computer system comprising one or more processors configured to:
obtain vehicle data from a vehicle data repository, the vehicle data comprising a vehicle feature, and the vehicle feature being stored in an original equipment manufacturer (OEM)-agnostic terminology;
train a machine learning algorithm to calculate effectiveness scores of updates to vehicle features;
receive information indicating an update to the vehicle feature was sent to vehicles having the vehicle feature;
construct a first dataset with data from before the update was sent to or implemented in the vehicles having the vehicle feature;
construct a second dataset with data from after the update was sent to or implemented in the vehicles having the vehicle feature; and
calculate an effectiveness score of the update by inputting both the first dataset and the second dataset into the trained machine learning algorithm.

11. The computer system of claim 10, wherein the vehicle feature is a vehicle safety feature.

12. The computer system of claim 10, wherein:
the vehicle feature is a forward collision warning system; and
the update to the vehicle feature makes a sensitivity metric of the forward collision warning system more sensitive.

13. The computer system of claim 10, wherein the one or more processors are further configured to:
determine vehicles that the update has been implemented in; and
wherein the first dataset is constructed from the data from the vehicles having the vehicle feature from before the update was implemented; and
wherein the second dataset is constructed from the data from the vehicles having the vehicle feature from after the update was implemented.

14. The computer system of claim 10, wherein the update to the vehicle feature comprises changes to button placement on a vehicle infotainment system.

15. The computer system of claim 10, wherein the one or more processors are further configured to:
receive insurance claims data; and
calculate an increase or decrease in insurance premiums for vehicles having implemented the update, wherein the calculation of the increase or decrease is based upon: (i) the insurance claims data, and (ii) the effectiveness score of the update.

16. A computer system for use in determining effectiveness of an update to a vehicle feature, the computer system comprising:
one or more processors; and
a non-transitory program memory communicatively coupled to the one or more processors and storing executable instructions that, when executed by the one or more processors, cause the computer system to:
obtain vehicle data from a vehicle data repository, the vehicle data comprising a vehicle feature, and the vehicle feature being stored in an original equipment manufacturer (OEM)-agnostic terminology;
train a machine learning algorithm to calculate effectiveness scores of updates to vehicle features;
receive information indicating an update to the vehicle feature was sent to vehicles having the vehicle feature;
construct a first dataset with data from before the update was sent to or implemented in the vehicles having the vehicle feature;
construct a second dataset with data from after the update was sent to or implemented in the vehicles having the vehicle feature; and
calculate an effectiveness score of the update by inputting both the first dataset and the second dataset into the trained machine learning algorithm.

17. The computer system of claim 16, wherein the vehicle feature is a vehicle safety feature.

18. The computer system of claim 16, wherein:
the vehicle feature is a forward collision warning system; and
the update to the vehicle feature makes a sensitivity metric of the forward collision warning system more sensitive.

19. The computer system of claim 16, wherein the instructions, when executed by the one or more processors, cause the computer system to:
determine vehicles that the update has been implemented in; and
wherein the first dataset is constructed from the data from the vehicles having the vehicle feature from before the update was implemented; and
wherein the second dataset is constructed from the data from the vehicles having the vehicle feature from after the update was implemented.

20. The computer system of claim 16, wherein the update to the vehicle feature comprises changes to button placement on a vehicle infotainment system.

* * * * *